(12) United States Patent
Brunet et al.

(10) Patent No.: US 7,844,445 B2
(45) Date of Patent: Nov. 30, 2010

(54) AUTOMATIC CONNECTION TO AN ONLINE SERVICE PROVIDER FROM A BACKUP SYSTEM

(75) Inventors: Jeffrey Brunet, Richmond Hill (CA); Ian Collins, Markham (CA); Yousuf Chowdhary, Maple (CA); Eric Li, Scarborough (CA)

(73) Assignee: Storage Appliance Corporation, Richmond Hill (CA)

( * ) Notice: Subject to any disclaimer, the term of this patent is extended or adjusted under 35 U.S.C. 154(b) by 432 days.

(21) Appl. No.: 11/801,240

(22) Filed: May 8, 2007

(65) Prior Publication Data

US 2007/0225962 A1    Sep. 27, 2007

Related U.S. Application Data

(60) Continuation-in-part of application No. 11/715,008, filed on Mar. 6, 2007, which is a continuation-in-part of application No. 11/506,386, filed on Aug. 18, 2006, which is a division of application No. 11/492,380, filed on Jul. 24, 2006, which is a continuation-in-part of application No. 11/546,176, filed on Oct. 10, 2006, which is a continuation-in-part of application No. 11/601,040, filed on Nov. 16, 2006, which is a continuation-in-part of application No. 11/506,386, filed on Aug. 18, 2006, and a continuation-in-part of application No. 11/546,176, filed on Oct. 10, 2006.

(60) Provisional application No. 60/725,225, filed on Oct. 12, 2005, provisional application No. 60/814,687, filed on Jun. 19, 2006, provisional application No. 60/817,540, filed on Jun. 30, 2006, provisional application No. 60/834,247, filed on Jul. 31, 2006, provisional application No. 60/836,228, filed on Aug. 9, 2006, provisional application No. 60/779,194, filed on Mar. 6, 2006, provisional application No. 60/799,395, filed on May 11, 2006.

(51) Int. Cl.
G06F 9/455    (2006.01)
G06F 3/00    (2006.01)
G06F 5/00    (2006.01)
G06F 13/12    (2006.01)

(52) U.S. Cl. .............................. 703/23; 710/8; 710/60; 710/62

(58) Field of Classification Search .................... 703/23
See application file for complete search history.

(56) References Cited

U.S. PATENT DOCUMENTS

| | | |
|---|---|---|
| 5,212,784 A | 5/1993 | Sparks |
| 5,666,215 A | 9/1997 | Fredlund et al. |
| 5,835,759 A | 11/1998 | Moore et al. |
| 5,959,280 A | 9/1999 | Kamitami |
| 5,960,411 A | 9/1999 | Hartman et al. |
| 6,119,153 A | 9/2000 | Dujari et al. |
| 6,131,148 A | 10/2000 | West |
| 6,282,710 B1 | 8/2001 | Boehler |
| 6,401,214 B1 | 6/2002 | Li |
| 6,405,362 B1 | 6/2002 | Shih et al. |
| 6,411,943 B1 * | 6/2002 | Crawford .................... 705/400 |
| 6,469,967 B1 | 10/2002 | Mau |
| 6,473,794 B1 | 10/2002 | Guheen |
| 6,477,575 B1 | 11/2002 | Koeppel et al. |
| 6,488,581 B1 | 12/2002 | Stockdale |
| 6,506,236 B2 | 1/2003 | Pollack |
| 6,529,992 B1 | 3/2003 | Thomas et al. |
| 6,567,273 B1 | 5/2003 | Liu |
| 6,588,662 B1 | 7/2003 | Hu |
| 6,603,676 B2 | 8/2003 | Kitagawa |
| 6,606,644 B1 | 8/2003 | Ford et al. |
| 6,609,173 B1 | 8/2003 | Watkins |
| 6,611,850 B1 | 8/2003 | Shen |
| 6,654,797 B1 | 11/2003 | Kamper |
| 6,684,229 B1 | 1/2004 | Luong et al. |
| 6,701,456 B1 | 3/2004 | Biessener |
| 6,731,536 B1 | 5/2004 | McClain et al. |
| 6,751,681 B2 | 6/2004 | Torii et al. |
| 6,813,725 B1 | 11/2004 | Hanes |
| 6,832,107 B2 | 12/2004 | Mashiko |
| 6,839,721 B2 | 1/2005 | Schwols |

| | | | | | | |
|---|---|---|---|---|---|---|
| 6,845,464 B2 | 1/2005 | Gold | | 2004/0172427 A1 | 9/2004 | Thomas et al. |
| 6,856,425 B2 | 2/2005 | Ozawa et al. | | 2004/0172489 A1 | 9/2004 | Shikada |
| 6,868,227 B2 | 3/2005 | Luman | | 2004/0184174 A1 | 9/2004 | Woo |
| 6,876,461 B2 | 4/2005 | Usami | | 2004/0193744 A1 | 9/2004 | Paley |
| 6,879,988 B2 | 4/2005 | Basin et al. | | 2004/0199600 A1 | 10/2004 | Dorundo et al. |
| 6,889,376 B1 | 5/2005 | Barritz | | 2004/0230653 A1 | 11/2004 | Liao |
| 6,898,517 B1 | 5/2005 | Froeberg | | 2004/0230863 A1 | 11/2004 | Buchhorn |
| 6,901,493 B1 | 5/2005 | Maffezzoni | | 2004/0243745 A1 | 12/2004 | Bolt |
| 6,943,681 B2 | 9/2005 | Rezvani et al. | | 2005/0010835 A1 | 1/2005 | Childs et al. |
| 6,976,253 B1 | 12/2005 | Wierman et al. | | 2005/0015536 A1 | 1/2005 | Lee |
| 6,985,248 B2 | 1/2006 | Parulski et al. | | 2005/0015559 A1 | 1/2005 | Shen et al. |
| 6,986,030 B2 | 1/2006 | Shmueli et al. | | 2005/0021880 A1 | 1/2005 | Robbin et al. |
| 6,993,760 B2 | 1/2006 | Peev et al. | | 2005/0027956 A1 | 2/2005 | Tormasov et al. |
| 7,017,155 B2 | 3/2006 | Peev et al. | | 2005/0033911 A1 | 2/2005 | Kitamura et al. |
| 7,024,529 B2 | 4/2006 | Yamada | | 2005/0052548 A1* | 3/2005 | Delaney ............... 348/231.2 |
| 7,054,260 B2 | 5/2006 | Rilum et al. | | 2005/0060356 A1 | 3/2005 | Saika |
| 7,054,594 B2 | 5/2006 | Bloch et al. | | 2005/0071524 A1 | 3/2005 | Liu et al. |
| 7,095,519 B1* | 8/2006 | Stewart et al. ............ 358/1.15 | | 2005/0080973 A1 | 4/2005 | Lee |
| 7,111,121 B2 | 9/2006 | Oishi et al. | | 2005/0081006 A1 | 4/2005 | Shackelford et al. |
| 7,136,288 B2 | 11/2006 | Hoogerdijk | | 2005/0083741 A1 | 4/2005 | Chang et al. |
| 7,137,034 B2 | 11/2006 | Largman | | 2005/0114450 A1 | 5/2005 | DeVos |
| 7,162,500 B2 | 1/2007 | Iguchi | | 2005/0157315 A1* | 7/2005 | Kato ......................... 358/1.1 |
| 7,165,082 B1 | 1/2007 | DeVos | | 2005/0157603 A1 | 7/2005 | Tseng |
| 7,200,546 B1 | 4/2007 | Nourmohamadian | | 2005/0174676 A1 | 8/2005 | Lin |
| 7,207,033 B2 | 4/2007 | Kung | | 2005/0182872 A1 | 8/2005 | Shih |
| 7,266,668 B2 | 9/2007 | Hartung | | 2005/0193389 A1 | 9/2005 | Murphy et al. |
| 7,302,538 B2 | 11/2007 | Liu | | 2005/0213146 A1* | 9/2005 | Parulski ................... 358/1.15 |
| 7,305,577 B2 | 12/2007 | Zhang | | 2005/0216746 A1 | 9/2005 | Saika |
| 7,308,528 B2 | 12/2007 | Kitamura | | 2005/0216794 A1 | 9/2005 | Yagawa |
| 7,330,997 B1 | 2/2008 | Odom | | 2005/0226059 A1 | 10/2005 | Kavuri et al. |
| 7,401,194 B2 | 7/2008 | Jewell | | 2005/0228836 A1 | 10/2005 | Bacastow |
| 7,461,144 B1 | 12/2008 | Beloussov | | 2005/0245249 A1 | 11/2005 | Wierman et al. |
| 7,519,767 B2 | 4/2009 | Slater | | 2005/0246583 A1 | 11/2005 | Robinson |
| 7,558,928 B1 | 7/2009 | DeVos | | 2005/0253554 A1 | 11/2005 | DiFazio et al. |
| 7,606,946 B2 | 10/2009 | Kobayashi et al. | | 2005/0268339 A1 | 12/2005 | Bobrow |
| 7,761,456 B1 | 7/2010 | Cram et al. | | 2005/0278432 A1 | 12/2005 | Feinleib et al. |
| 2001/0047389 A1 | 11/2001 | Prahlad et al. | | 2006/0010078 A1 | 1/2006 | Rezvani et al. |
| 2001/0056425 A1 | 12/2001 | Richard | | 2006/0031289 A1 | 2/2006 | Experton |
| 2002/0023198 A1 | 2/2002 | Kokubun et al. | | 2006/0036553 A1 | 2/2006 | Gupta et al. |
| 2002/0026575 A1 | 2/2002 | Wheeler et al. | | 2006/0041639 A1 | 2/2006 | Lamkin et al. |
| 2002/0036850 A1 | 3/2002 | Lenny et al. | | 2006/0059308 A1 | 3/2006 | Uratani et al. |
| 2002/0064111 A1 | 5/2002 | Horie | | 2006/0069921 A1 | 3/2006 | Camaisa et al. |
| 2002/0112171 A1 | 8/2002 | Ginter et al. | | 2006/0075293 A1 | 4/2006 | Bodlaender |
| 2002/0162009 A1 | 10/2002 | Shmueli et al. | | 2006/0080521 A1 | 4/2006 | Barr et al. |
| 2002/0184115 A1 | 12/2002 | Mueller et al. | | 2006/0101191 A1 | 5/2006 | Pinson |
| 2002/0184459 A1 | 12/2002 | Taussig et al. | | 2006/0123189 A1 | 6/2006 | Bitner et al. |
| 2002/0188566 A1 | 12/2002 | Inchalik et al. | | 2006/0143376 A1 | 6/2006 | Matze et al. |
| 2002/0191788 A1 | 12/2002 | Inchalik et al. | | 2006/0161635 A1 | 7/2006 | Lamkin et al. |
| 2002/0196729 A1 | 12/2002 | Fairman et al. | | 2006/0161802 A1 | 7/2006 | Wang et al. |
| 2002/0196940 A1 | 12/2002 | Isaacson et al. | | 2006/0164891 A1 | 7/2006 | Mills |
| 2003/0011809 A1* | 1/2003 | Suzuki et al. ............ 358/1.15 | | 2006/0179448 A1 | 8/2006 | Smith et al. |
| 2003/0048735 A1 | 3/2003 | Sawada et al. | | 2006/0190722 A1 | 8/2006 | Sharma et al. |
| 2003/0050940 A1 | 3/2003 | Robinson | | 2006/0198202 A1 | 9/2006 | Erez |
| 2003/0058763 A1 | 3/2003 | Noda | | 2006/0200623 A1 | 9/2006 | Gonzalez et al. |
| 2003/0069750 A1 | 4/2003 | Siegel et al. | | 2006/0218435 A1 | 9/2006 | van Ingen et al. |
| 2003/0074529 A1 | 4/2003 | Crohas | | 2006/0224846 A1 | 10/2006 | Amarendran et al. |
| 2003/0105643 A1* | 6/2003 | Chen et al. ..................... 705/1 | | 2007/0006017 A1 | 1/2007 | Thompson et al. |
| 2003/0120740 A1 | 6/2003 | Beeman et al. | | 2007/0043888 A1 | 2/2007 | Suzuki et al. |
| 2003/0149662 A1 | 8/2003 | Shore | | 2007/0043889 A1 | 2/2007 | Sanada et al. |
| 2003/0156341 A1 | 8/2003 | Ito | | 2007/0043973 A1 | 2/2007 | Schneider |
| 2003/0163610 A1 | 8/2003 | Stevens | | 2007/0179955 A1 | 8/2007 | Croft et al. |
| 2003/0182471 A1 | 9/2003 | Harris et al. | | 2007/0214332 A1 | 9/2007 | Sonoda et al. |
| 2003/0190137 A1 | 10/2003 | Pesce | | 2007/0250655 A1 | 10/2007 | Ferchau et al. |
| 2003/0195737 A1 | 10/2003 | Shapiro et al. | | 2008/0133827 A1 | 6/2008 | Topham et al. |
| 2003/0225971 A1 | 12/2003 | Oishi et al. | | 2008/0215873 A1 | 9/2008 | Bobrow |
| 2004/0008209 A1 | 1/2004 | Adams et al. | | | | |
| 2004/0044863 A1 | 3/2004 | Trimmer et al. | | | FOREIGN PATENT DOCUMENTS | |
| 2004/0078514 A1 | 4/2004 | Kung et al. | | | | |
| 2004/0083473 A1 | 4/2004 | Thomas et al. | | EP | 1168322 A1 | 1/2002 |
| 2004/0088456 A1 | 5/2004 | Zhang | | EP | 1233409 A2 | 8/2002 |
| 2004/0145988 A1 | 7/2004 | Watanabe | | EP | 1717697 A2 | 11/2006 |
| 2004/0153614 A1 | 8/2004 | Bitner et al. | | JP | 2003150849 A * | 5/2003 |
| 2004/0167941 A1 | 8/2004 | Prahlad et al. | | WO | WO 00/19294 | 4/2000 |

| | | |
|---|---|---|
| WO | WO 01/27768 | 4/2001 |
| WO | WO 01/84265 | 11/2001 |
| WO | WO 02/18009 | 3/2002 |
| WO | WO 02/39231 | 5/2002 |
| WO | WO 03/014933 | 2/2003 |
| WO | WO 03/048944 | 6/2003 |
| WO | WO 2004/067286 | 8/2004 |
| WO | WO 2007/041849 | 4/2007 |
| WO | WO 2007/041850 | 4/2007 |

OTHER PUBLICATIONS

Rothman, Wilson, "Now It's Easy to Back Up Data on a Network," The New York Times, Mar. 30, 2006, http://www.nytimes.com.

TurnKey Technology Solutions, Apr. 10, 2007, http://www.turnkeytechnology.biz/.

Takahashi, Dean, "Backup Drive Fits in a Pocket," First Look, Tech Insider, San Jose Mercury News, Jun. 4, 2007, pp. 2E.

Wong, Nicole, "One Key Stroke Saves Your Data," First Look, Tech Insider, San Jose Mercury News, Apr. 2, 2007, pp. 2E.

Duryee, Tricia, "Store Your Digital Content on a Hard Drive in the Sky," Tech Monday, San Jose Mercury News, Jul. 3, 2006, pp. 5E.

Brown, Christopher L. T., "Analysis of the ATA Protected Area," Technical White Paper, TechPathways LLC, 2002, www.TechPathways.com.

Parvaneh, Marc K., "CDR-ROM™ Overview & Implementations," ODC White Paper, Optical Disc Corporation.

"Backup Drives Essential but Underused," Consumer Report, Sep. 2006, pp. 30-31.

"Enhanced Drive Self-Test—Winning the War Against Unnecessary Drive Returns," Executive Summary, Personal Storage Product Marketing, Jun. 2000, No. TP-302.1, Seagate.

Evans, Mark, "Hard Drive Self-Tests," Quantum Corporation, Apr. 26, 1999, T10/99-179 rev 0.

"Attachment Extractor for Outlook Express v. 1.5," Software, 2003-2008 NSoftware.

"Mailbox Fetch," Group Fetch, 2006 GroupFetch.com.

"Outlook, Outlook Express, and Windows Mail Attachment Tools . . .," Outlook Attachment and Picture Extractor, 2006, OPE2000.com.

"Save Message," InboxRULES, Ornic USA, LLC, 1996-2007, Ornic USA, LLC.

Mirra.com, "Frequently Asked Questions about Mirra" Feb. 2005, Mirra.com and Archive.org <http://web.archive.org/web/20050206184942/www.mirra.com/product/file_backup_guide.html>, pp. 1-5.

Mirra.com "Why Mirra is Different . . . and Better" Feb. 2005, Mirra.com and Archive.org <http://web.archive.org/web/20050206192005/www.mirra.com/product/why_mirra_is_different.html>, p. 5.

Page 2 from the following web page archived on Jan. 25, 2005: http://web.archive.org/web/20050125085304/http://www.bjorn3d.com/read.php?cID=748.

Scott Clark, "U3—Official Portable USB Apps Platform", Oct. 13, 2005, Everything USB website via Archive.org, <www.everythingusb.com/u3.html>, pp. 1-5.

Brown University, "Image File Format" Jun. 22, 2006, www.archive.org <http://web.archive.org/web/20060622060840/http://cs.brown.edu/stc/summer/workshop/summer_formats.html>, p. 1-2.

Dr. Caroline Musselwhite et al., "AAC Intervention" 2005 <http://www.aacintervention.com/tipfive.html>, pp. 1-3.

Dr. Caroline Musselwhite et al., "About Graphics/Digital Images" AACIntervention, pp. 1-6.

Scott Clark, "U3—Official Portable USB Apps Platform", Oct. 12, 2005, Everything USB website via Archive.org, , www.everythingusb.com/u3.html>, pp. 1-5.

IBM, "Automatic Tape Backup of Customer's Critical Direct Access Storage Device Areas". IBM Technical Disclosure Bulletin, vol. 39, Issue 12, pp. 37-38. Dec. 1, 1996.

Wikipedia, "Image File Formats" Jul. 13, 2006, Wikipedia.org, p. 1-5.

Wikipedia, "Audio file format" Jul. 29, 2006, Wikipedia.org, p. 1-4.

Wikipedia, "MPEG-4 Part 14" Jun. 5, 2006, Wikipedia.org, p. 1-3.

Seagate, "Enhanced Drive Self-Test—Winning the War Against Unnecessary Drive Returns", Jun. 2000, Seagate, pp. 1-4.

"LapBack 1.9.8", CNET.com, Sep. 3, 2005.

"LapBack U3", Software Central, copyright 2005.

* cited by examiner

*Primary Examiner*—Kamini S Shah
*Assistant Examiner*—Angel J Calle
(74) *Attorney, Agent, or Firm*—Gard & Kaslow LLP

(57) ABSTRACT

A software application is provided for a user to select a backed up data file and specify a task to be performed by an online service provider on the selected file. The application automatically connects to the online service provider and uploads the selected file for the online service provider to perform the task. Tasks that can be performed include printing, sharing, viewing, playing and archiving the selected file. Task preferences, user settings and user information can also be specified by the user and uploaded to the online service provider. Automatic connection to the online service provider can be via default setting, selected file type, or specified task. Alternatively, the user can designate which service provider is to perform the task. Payment for the task can be accomplished via bundled credits or by other payment mechanisms.

29 Claims, 14 Drawing Sheets

AUTOMATIC CONNECTION TO AN ONLINE SERVICE PROVIDER FROM A BACKUP SYSTEM

CROSS-REFERENCE TO RELATED APPLICATIONS

This application is a Continuation-in-Part of U.S. Non-Provisional Patent Application No. 11/715,008 filed on Mar. 6, 2007 and entitled "Systems and Methods for Selecting and Printing Data Files from a Backup System;" non-Provisional Patent Application No. 11/715,008 is a Continuation-in-Part of U.S. Non-Provisional Patent Application No. 11/506,386 filed on Aug. 18, 2006 and entitled "Data Backup Devices and Methods for Backing up Data" which is a divisional application of U.S. Non-Provisional Patent Application No. 11/492,380 filed on Jul. 24, 2006 and entitled "Emulation Component for Data Backup Applications" which claims the benefit of U.S. Provisional Patent Application No. 60/725,225 filed on Oct. 12, 2005 and entitled "Method, Apparatus and a System for Removable Media Device Emulation on an External Storage Device via an Emulation Component for the Purpose of an Electronic Data Backup Appliance," U.S. Provisional Patent Application No. 60/814,687 filed on Jun. 19, 2006 and entitled "Portable Electronic Data Backup Appliance Based on Integrated Circuit (IC) Memory," and U.S. Provisional Patent Application No. 60/817,540 filed on Jun. 30, 2006 and entitled "Portable Data Backup Appliance for Utilizing a Recordable Media Burner Device;" non-Provisional Patent Application No. 11/715,008 is also a Continuation-in-Part of U.S. Non-Provisional Patent Application No. 11/546,176 filed on Oct. 10, 2006 and entitled "Optical Disc Initiated Data Backup" which claims the benefit of U.S. Provisional Patent Application No. 60/834,247 filed on Jul. 31, 2006 and entitled "Portable Electronic Data Backup Appliance Utilizing a Hybrid Optical Disc" and U.S. Provisional Patent Application No. 60/836,228 filed on Aug. 9, 2006 and also entitled "Portable Electronic Data Backup Appliance Utilizing a Hybrid Optical Disc;" non-Provisional Patent Application No. 11/715,008 is also a Continuation-in-Part of U.S. Non-Provisional Patent Application No. 11/601,040 filed on Nov. 16, 2006 and entitled "Methods for Selectively Copying Data Files to Networked Storage and Devices for Initiating the Same" which is also a Continuation-in-Part of U.S. Non-Provisional Patent Application No. 11/506,386 filed Aug. 18, 2006 and a Continuation-in-Part of U.S. Non-Provisional Patent Application No. 11/546,176 filed Oct. 10, 2006; non-Provisional Patent Application No. 11/715,008 additionally claims the benefit of U.S. Provisional Patent Application No. 60/779,194 filed on Mar. 6, 2006 and entitled "Method, a Process and a System for Selecting and Printing Digital Files from a Backup Appliance;" this application additionally claims the benefit of U.S. Provisional Patent Application No., 60/799,395 filed on May 11, 2006 and entitled "Method, a Process and a System for Automatically Connecting to Online Services from a Backup Appliance." Each of the aforementioned applications is incorporated herein by reference.

BACKGROUND OF THE INVENTION

1. Field of the Invention

The present invention relates generally to the field of digital data management and more particularly to systems for data backup applications.

2. Description of the Prior Art

Digital content, represented by digital data files of various file types, is rapidly replacing other forms of content. Documents, presentations, photos, movies, and music, for example, are increasingly produced and stored digitally. A problem for many individuals and organizations is that digital content, typically stored on a computer hard drive, can be poorly organized and needs to be archived to be protected against accidental loss. For example, digital photo files on a personal computer (PC) are likely to be found in numerous folders—photos transferred from a digital camera are stored in one set of folders, photos received as e-mail attachments are stored in other folders, and photos downloaded from websites are stored in still other folders.

One approach to archiving digital content is to periodically backup all of the data files on the computer, preserving the existing organizational structure. While this technique is effective to preserve digital content against accidental loss, the technique has several shortcomings. For one, the resulting copy is no better organized than the original, so misplaced or disorganized content remains misplaced or disorganized. Also, backing up all data files requires substantial memory capacity to copy numerous files that are otherwise already preserved elsewhere. Application specific files, for example, originally loaded onto the computer from a compact disc (CD) are already archived on the CD and therefore do not need to be backed up.

The necessary storage capacity for a complete backup can be obtained with writable data storage media, such as hard disc drives (HDDs), however, these require device installation and software set-up when first connected to a system. In order to complete these steps, a user may have to provide information about the existing system, which the user may not readily know. Also, the user may have to make decisions regarding the configuration of the device and the backup software. The number of steps involved with installation and set-up, as well as the complexity of some of the steps, dissuades many users from bothering with backup applications. The expense of a writable data storage media with enough capacity to perform a complete backup can also dissuade users from performing complete backups. Furthermore, some users, having bought and installed the necessary storage capacity, are dissuaded from performing frequent backups due to the length of time the system is tied up while performing a complete backup.

Alternately, a user can manually select a set of files from a directory and copy the selected files to a storage device. While this alternative may allow usage of a smaller memory device that does not require installation and set-up steps, manually selecting files is time-consuming. Also, manually selecting files creates the possibility of an accidental omission of some files.

Another issue raised by digital content, and especially digital photos, relates to printing. For example, when a person takes a digital camera memory medium to a photo printing kiosk, the kiosk has to read all of the photos from the memory medium before displaying the photos so that the person can select just some of the displayed photos for printing. Where the number of photos on the memory medium is large, reading all of the photos can be very time consuming as well as inefficient when only a small number of photos are to be printed. As an alternative, printing from an online photo printing service is also becoming popular. However, if the user wishes to print photos stored in different directories on a PC, or even in e-mail attachments, selecting the photos and uploading the photos to the online photo printing service can be cumbersome. Still another frequently encountered problem is seeking to make a print of a photo but not being able to recall where, amongst the various folders and e-mails on a PC, the photo is stored. Without knowing the photo's file name, search functions can be of little help, and may be of no help where the photo is stored as an e-mail attachment.

An issue with online photo printing, and other online services, is that identifying and/or locating an online service provider, connecting to the online service provider, uploading data to the online service provider, and specifying tasks to be performed by the online service provider can require a large number of user steps. For example, connecting to the online service provider typically requires establishing an Internet connection, opening a browser, identifying and/or locating an online service provider, providing a URL, and then entering a user name and password. Where the user does not know the URL of the online service provider, or does not even know which online service provider to use, the user may have to perform a search with a search engine. Where the user has not used the online service provider previously, the user may additionally have to register with the online service provider, which entails still further steps. After getting past the online service provider's log in page, the user still has to navigate the website, select images or other data to upload, wait while the files are uploaded, and indicate the desired tasks to be performed. Additionally, the user may have to provide some form of payment, and may have to fill out forms with shipping and billing addresses. What is needed, therefore, is the ability to simplify the process of connecting with, and communicating tasks to, as well as potentially having to locate and identify, an online service provider.

SUMMARY

An exemplary data backup system comprises a communication interface, a first storage device, and an emulation component. The first storage device includes a writable data storage medium comprising first and second logical storage areas, and in some embodiments the first logical storage area stores a data backup application. The emulation component is in communication between the first storage device and the communication interface. The emulation component comprises logic configured to represent the first logical storage area as an auto-launch device, and additional logic configured to represent the second logical storage area as a second storage device including a writable data storage medium. It will be appreciated that the logic of the emulation component can be implemented through software, hardware, firmware, or a combination thereof.

The emulation component of the exemplary data backup system can also comprise, in some embodiments, logic configured to receive auto-launch device commands from the communication interface, translate the auto-launch device commands to first storage device commands, and send the first storage device commands to the first logical storage area, and additional logic configured to receive first storage device responses from the first logical storage area, translate the first storage device responses into auto-launch device responses, and send the auto-launch device responses to the communication interface. The emulation component can further comprise logic configured to receive second storage device commands from the communication interface and send the second storage device commands to the second logical storage area, and additional logic configured to receive second storage device responses from the second logical storage area, and send the second storage device responses to the communication interface.

In some embodiments the first storage device comprises a HDD, and in some of these embodiments the first and second logical storage areas comprise first and second partitions of the HDD. In other embodiments the first storage device comprises solid-state memory or an optical device. Suitable solid state memories include any solid state memory that can be written at least once, including a Secure Digital (SD) memory card, a Compact Flash (CF) memory card, or a memory stick. Suitable optical devices include CD and Digital Video Disc (DVD) drives. Exemplary writable data storage media for these drives include Compact Disc-Recordable (CD-R) and Compact Disc ReWritable (CD-RW) media, and Digital Video Disc-Recordable (DVD-R and DVD+R) and Digital Video Disc ReWritable (DVD-RW and DVD+RW) media, respectively.

An exemplary method for backing up data stored on a data source comprises returning a response to an inquiry from the data source. The response identifies a first storage device of a first device type as instead being of a second device type. Here, the second device type belongs to a class of device types that, upon connection to the data source, will trigger an operating system of the data source to automatically execute a backup application stored on the first storage device. The exemplary method further comprises providing the backup application to the data source to selectively copy data stored on the data source. Providing the backup application includes receiving auto-launch device commands from the data source, translating the auto-launch device commands into first storage device commands, and sending the first storage device commands to the storage device. Providing the backup application also includes receiving first storage device responses from the first storage device, translating the first storage device responses into auto-launch device responses, and sending the auto-launch device responses to the data source.

In some embodiments, the method for backing up data stored on the data source also comprises selectively copying data files to a second storage device, and in some embodiments the first storage device comprises the second storage device. In other embodiments, selectively copying data files includes sending copied files to a web-based storage facility. Selectively copying data files can include searching one or more storage devices associated with the data source for data files that meet a predefined criterion, for example, that the data files have not previously been copied to a data backup system, or that the data files have a file type associated with a type of content. Selectively copying data files can also include creating a directory structure on the second storage device to indicate the location of a copied file on the data source. Selectively copying data files can further include determining whether a data source has been previously paired with a data backup system. Selectively copying data files can be initiated, in some embodiments, by a user command or by connecting a removable storage device to a communication port of a data backup system.

An exemplary method for backing up data from a data source comprises detecting an optical disc in an optical drive of the data source, auto-launching a data backup application stored on the optical disc, and using the data backup application to copy a data file across a network to a networked storage. The networked storage can comprise, for example, a storage area network or a server of a commercial service provider. The commercial service provider can be predetermined, in some embodiments. The networked storage can also comprise a user-selected location. In some embodiments the method further comprises finding on the optical disc an Autorun.inf file that points to the data backup application. The method can also comprise finding the data file according to a criterion that can be predetermined or user-specified.

An exemplary data backup device comprises an optical disc comprising computer-readable instructions including auto launch instructions and a backup application. The auto-launch instructions are configured to point to the backup application and can comprise, in some embodiments, an Autorun.inf file. The backup application is configured to find data files on the data source according to a criterion, and back up the data files across a network to a networked storage. The criterion can be a type of content, and in some instances the criterion is pre-determined. The backup application can also be further configured to allow a user to specify the criterion. The networked storage can comprise, for example, a storage area network or a server of a commercial service provider. In some embodiments the commercial service provider is pre-determined. The backup application can be further configured, in some embodiments, to allow a user to specify a location of the networked storage.

An exemplary data backup system of the invention comprises a USB flash drive. The USB flash drive includes a USB interface, a flash memory, and an emulation component in communication between the flash memory and the USB interface. The emulation component includes logic configured to represent the flash memory as an auto-launch device. The flash memory includes computer-readable instructions comprising a backup application configured to selectively copy data files from a data source to a networked storage, such as a server of a commercial service provider. In some embodiments the backup application is further configured to allow a user to specify an address of the networked storage, while in other embodiments the backup application is further configured with a predetermined address of the networked storage.

Methods for backing up data stored on a data source are also provided. An exemplary method comprises providing a response to an inquiry from the data source, where the response identifies a flash memory of a USB flash drive as being an auto-launch device. The response is provided through a USB interface of the USB flash drive to the data source. The method further comprises providing a backup application from the flash memory of the USB flash drive to the data source, the backup application being configured to selectively copy data files stored on the data source to a networked storage. In some embodiments, the response identifying the flash memory as being an auto-launch device identifies the flash memory as a CD drive including a CD medium or a DVD drive including a DVD medium. In some embodiments, providing the backup application includes receiving auto-launch device commands from the data source, translating the auto-launch device commands to flash memory commands, and sending the flash memory commands to the flash memory; and in these embodiments providing the backup application further includes receiving flash memory responses from the flash memory, translating the flash memory responses into auto-launch device responses, and sending the auto-launch device responses to the data source.

Still another exemplary backup system of the invention comprises a communication interface and a first storage device including a writable data storage medium comprising first and second logical storage areas. The first logical storage area includes computer-readable instructions of a backup application configured to back up data files from a data source and to provide a GUI for selecting a data file for printing from amongst the backed up data files. The backup system also comprises and an emulation component in communication between the first storage device and the communication interface. The emulation component comprises logic configured to represent the first logical storage area as an auto-launch device, and logic configured to represent the second logical storage area as a second storage device including a writable data storage medium. In some embodiments, the backup system further comprises a display device, and the backup application is further configured to provide the GUI on the display device.

The backup application of the backup system can be further configured to back up data files from the data source to the second logical storage area. The backup application can also be configured to store a copy of the data file selected for printing in a print folder in the second logical storage area. In other embodiments, the backup application can be configured to store a pointer to the data file selected for printing, or a file name of the selected data file, in the print folder.

Still another exemplary backup system of the invention comprises a data storage medium comprising an optical disc including a writable portion, and a read-only portion comprising computer-readable instructions of a backup application configured to back up data files from a data source to the writable portion and to provide a GUI for selecting a data file for printing from amongst the backed up data files. The optical disc can comprise, in some embodiments, a hybrid optical disc. The backup application can also be configured to store a copy of the data file selected for printing in a print folder in the writable portion. In other embodiments, the backup application can be configured to store a pointer to the data file selected for printing, or a file name of the selected data file, in the print folder.

Still another exemplary backup system of the invention comprises a USB flash drive including a USB interface, a flash memory including computer-readable instructions comprising a backup application configured to selectively back up data files from a data source to a networked storage and to provide a GUI for selecting a data file for printing from amongst the backed up data files, and an emulation component in communication between the flash memory and the USB interface. Here, the emulation component includes logic configured to represent the flash memory as an auto-launch device. The networked storage can comprise a server of a commercial service provider, and in some of these embodiments the commercial service provider comprises an online photo printing service.

Still another exemplary method of the invention comprises backing up data files from a data source using an auto-launched backup application configured to automatically configure and execute upon connection of a backup system to the data source, providing a GUI that allows a user to select, from amongst the backed up data files, a data file for printing, receiving a user selection of a data file to be printed from amongst the backed up data files, and populating a first print folder. Backing up data files from the data source can include copying the data files to the backup system where the backup system comprises, for example, a hard disk drive or an optical disc. Backing up data files from the data source can also include copying the data files to a networked storage. In some embodiments, receiving the user selection of the data file to be printed includes receiving a printing option pertaining to the selected data file.

Populating the first print folder can include storing in the first print folder a copy of the selected data file. Some of these embodiments further comprise sending the copy of the selected data file to a printer connected to the data source, which can be a networked printer connected to the data source by a network connection, or sending the copy of the selected data file to an online service provider or kiosk. Where backing up data files from the data source includes copying the data files to the backup system, the method can further comprise sending the copy of the selected data file to a printer connected to the backup system.

Populating the first print folder can include storing a pointer in the first print folder, the pointer being to the selected data file, or storing a file name of the selected data file in the first print folder. Some of these embodiments further comprise using the pointer or file name to locate the selected data file and sending the selected data file to a printer connected to the data source, which can be a networked printer connected to the data source by a network connection, or sending the selected data file to an online service provider or kiosk. Where backing up data files from the data source includes copying the data files to a backup system, the method can further comprise sending the selected data file to a printer connected to the backup system.

Additionally, the method can further comprise populating a second print folder. The first print folder can be populated with an image type of data file and the second print folder can be populated with a document type of data file, for example. As another example, the first print folder can be populated with a data file for a first printing alternative, such as an online service provider, and the second print folder can be populated with a data file for a second printing alternative, such as a local printer.

Still another exemplary method of the invention comprises connecting a backup system to a data source to auto-launch a backup application stored on the backup system, the backup application being configured to selectively back up data files from the data source and provide a GUI for selecting a data file for printing from amongst the backed up data files. The method further comprises selecting, through the GUI, a data file to be printed from amongst the selectively backed up data files, and printing the data file. The method can further comprise disconnecting the backup system from the data source before printing the data file. In some embodiments, printing the data file includes connecting the backup system to a kiosk. Printing the data file can also include connecting the backup system to a printer. The method can also further comprise selecting an online printing service before printing the data file.

Still another method of the invention comprises providing a GUI for a user to select a data file from amongst a set of backed up data files and to specify a task for an online service provider. The method additionally comprises receiving a user selection of a data file from amongst the set of backed up data files, receiving a task specification for the online service provider, automatically connecting to the online service provider, and uploading the selected backed up data file to the online service provider. The method further comprises, in some embodiments, uploading the task specification to the online service provider. In various embodiments, receiving the task specification includes receiving a specification to print, share, view, play, or archive the selected backed up data file. Receiving the task specification can also include receiving a task preference.

Further, automatically connecting to the online service provider can include identifying the online service provider which can include obtaining the online service provider from the specification of the task, using a default setting, or following a rule. Logging on to the online service provider can include, in some embodiments, providing default user credentials to the online service provider. Also, providing payment information to the online service provider can include applying bundled credits.

The present invention also provides a computer readable medium having stored thereupon computing instructions. The computing instructions comprise a code segment to provide a GUI for selection of a backed up data file from amongst a set of backed up data files and specification of a task for an online service provider. The computing instructions also comprise code segments to receive a selection of a backed up data file from amongst the set of backed up data files, receive a task specification for the online service provider, automatically connect to the online service provider, and upload the selected data file to the online service provider. The computing instructions can also comprise a code segment to upload the task specification to the online service provider. The computing instructions can further comprise a code segment to provide payment information to the online service provider by applying bundled credits. In some embodiments, the code segment to receive the task specification includes a code segment to receive a task preference. The code segment to automatically connect to the online service provider can also include a code segment to identify the online service provider. The code segment to automatically connect to the online service provider can include a code segment to provide default user credentials to the online service provider.

DETAILED DESCRIPTION OF THE INVENTION

A data backup system is provided for personal, as well as commercial, applications. The data backup system of the present invention allows files to be selectively copied from a data source, such as a personal computer, to a storage device according to some criteria such as file type. For example, the system can be configured to backup audio files having recognized music file extensions such as .mp3 and .wav, or image files having recognized image file extensions such as .jpg, .pct, and .tif. The data backup system, according to some embodiments, stores a backup application that automatically launches when the data-backup system is connected to the data source. The backup application can be configured to require little or no user input to perform the backup process.

The data backup system can take a number of different forms. One example is an appliance that includes both the backup application and sufficient storage capacity for copied files. Another example is a device that includes the backup application and an interface for connecting sufficient storage capacity in the form of a storage device such as an external HDD or flash memory device. In both examples, the system includes an emulation component. The emulation component makes the portion of the data backup system that contains the backup application appear to the data source as if it were of a particular device type. More specifically, the backup application portion of the data backup system is represented as being one of a class of storage devices referred to herein as "auto-launch devices." Emulating an auto-launch device allows the data backup system to take advantage of automatic execution capabilities of certain operating systems so that the backup application will automatically be executed when the device is connected to a data source running the operating system.

Figure 1:
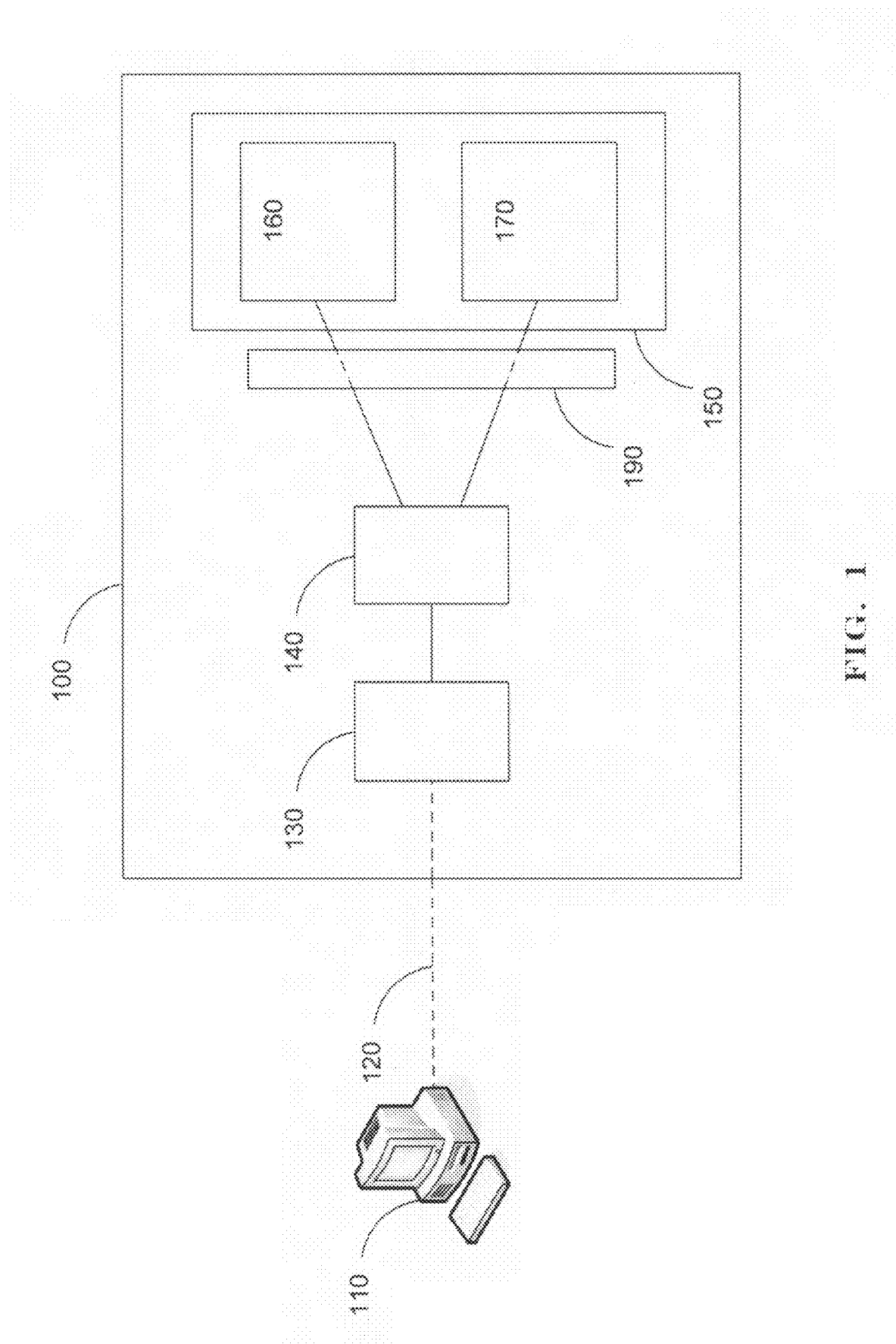
FIG. 1 is a schematic representation of a data backup system according to an exemplary embodiment of the present invention.

FIG. 1 provides a schematic representation of an exemplary embodiment of a data backup system 100 connected to a data source 110 by a connection 120. The data source 110 can be, for example, a personal computer (PC), a Macintosh computer (Mac), or a Personal Digital Assistant (PDA) on which data resides. The data source 110 can also comprise a server, a settop box, a television, a cellular telephone, a Smartphone, a digital still camera or video camera, a scanner, a digital music or video player, a game console, or a Personal Video Recorder (PVR). Preferably, the data source 100 includes an operating system (OS), such as Windows XP, that includes an automatic application launching function, as discussed in more detail elsewhere herein. Other suitable operating systems include Mac OS, Palm OS, Linux, and Unix, for example. The connection 120 between the backup system 100 and the data source 110 can be essentially any data transfer mechanism such as an optical or electrical cable, a wireless link, or a network connection. The connection 120 is shown with a dashed line in FIG. 1 to indicate that the connection 120 need only be temporary.

As shown in FIG. 1, the backup system 100 comprises a communication interface 130, an emulation component 140, and a storage device 150 that includes a first logical storage area 160 and second logical storage area 170. The communication interface 130 allows the data source 110 to communicate with the emulation component 140 of the backup system 100 according to a communication protocol. The communication interface 130 can be, for example, USB, FireWire, or a wireless interface such as infrared, Bluetooth, or WiFi.

It will be appreciated that the backup system 100 can include a plurality of communication interfaces 130, of the same or of different types, to accommodate multiple and/or different data sources 110. Depending on the type of communication interface 130, the communication interface 130 can include a communication port through which the connection 120 to the data source 110 is made. For instance, a USB communication interface 130 can include a USB communication port, and a FireWire communication interface 130 can include a FireWire communication port. Alternatively, the communication interface 130 can include a wireless antennae or an infrared transmitter/receiver unit for sending and receiving infrared signals.

The storage device 150 comprises a writable data storage medium and can be, for example, a HDD that has been partitioned into at least two logical storage areas. In this instance, each logical storage area is a partition of the HDD. Suitable HDDs for the storage device 150 include 1.0 inch, 1.8 inch, 2.5 inch, and 3.5 inch hard drives having capacities of 20 to 60 gigabytes (GB) or more. Other suitable storage devices 150 that include rewritable media are solid-state memory devices, such as SD memory cards and CF memory cards. The storage device 150 can also be an optical device such as a CD drive or a DVD drive where the writable data storage medium within such an optical storage device 150 can be either a write-once medium, such as a Compact Disc-Recordable (CD-R), DVD-Recordable (DVD-R or DVD+R), or a rewritable medium such as a Compact Disc-Rewritable (CD-RW), or DVD-Rewritable (DVD-RW or DVD+RW).

The storage device 150 can also be implemented by two different devices, one dedicated to each of the two logical storage areas 160, 170. For example, the first logical storage area 160 can be implemented by a CD drive with any CD media, while the second logical storage area 170 is implemented by a HDD. In a further example, the first logical storage area 160 can be implemented by a solid state memory while the second logical storage area 170 is implemented by an optical device with a writable data storage medium. In this further example, the two different devices could be contained within a common housing. It will be understood that the device types, form factors, and capacities provided herein are merely exemplary and not intended to be limiting.

In some embodiments, the backup system 100 further comprises a memory device interface 190 that allows the first and second logical storage areas 160 and 170 to communicate with the emulation component 140. In these embodiments the memory device interface 190 is of a type that is appropriate to the type of storage device 150. For instance, an Integrated Drive Electronics (IDE) interface 190 can be used with an IDE HDD storage device 150, and a Small Computer System Interface (SCSI) interface 190 can be used with a SCSI HDD storage device 150. Alternately, the memory device interface 190 can be a SD memory card host interface where the storage device 150 is a SD memory card. The interface 190 can also be a wireless interface such as infrared, WiFi, and Bluetooth. The memory device interface 190 can be implemented in the backup system 100 by an integrated circuit (IC) chip or through the use of discrete components. The memory device interface 190 is integrated into the memory device 150, in some embodiments. It will be appreciated that in the embodiments noted above that employ multiple storage devices 150, the backup system 100 can include multiple memory device interfaces 190 as appropriate.

The first logical storage area 160 represents a logical area of the memory device 150 that is meant to be inaccessible to the user and safe from accidental erasure. The first logical storage area 160 can contain, for example, a backup application, system files, drivers, and other setup and configuration software. The first logical storage area 160 is represented to the data source 110 by the emulation component 140 as being an auto-launch device. As used herein, auto-launch devices are those devices that will trigger the automatic execution functionalities of certain operating systems, such as the AutoRun function of the Microsoft Windows operating system. Examples of device types that will trigger AutoRun of Windows include CD and DVD drives when a CD or DVD medium is contained therein. In these examples, the Windows AutoRun functionality is triggered either when the CD/DVD is placed in the CD/DVD drive already connected to the data source 110, or when the CD/DVD drive, already containing the CD/DVD medium, is connected to the data source 110.

The second logical storage area 170 represents a logical area of the memory device 150 that is dedicated to storing backed-up data. Accordingly, the emulation component 140 represents the second logical storage area 170 to the data source as being a device type that includes a writable data storage medium. The second logical storage area 170 can be represented as a HDD, CF, or a SD memory card, for example. In some embodiments, the second logical storage area 170 can be represented as the same type of device as the storage device 150. In other embodiments the second logical storage area 170 can be represented to be a different device type than the storage device 150.

The emulation component 140 provides certain functions to the backup system 100 and can be implemented through logic such as software, firmware, hardware, or any combination of these. It will be understood that within an embodiment different functions of the emulation component can be implemented with different forms of logic. Thus, while one function of the emulation component 140 is implemented through firmware, for example, another function can be implemented through software.

In one embodiment, the emulation component 140 includes an IC. For example, the emulation component 140 can be implemented using software, firmware, hardware, or some combination thereof, incorporated in a USB controller chipset. In some USB-specific embodiments, the emulation component 140 implements some or all of a number of layered industry standards. Examples of such standards include USB Specification-Revision 2.0, USB Mass Storage Class-Bulk Only Transport-Revision 1.0, SCSI Primary Commands-3 (SPC-3), SCSI Block Commands-2 (SBC-2), Multimedia Commands-4 (MMC-4), and AT Attachment with Packet Interface-6 (ATA/ATAPI-6). It should be noted that in some embodiments the emulation component 140 may only support subsets of the commands of these industry standards.

Functions provided by the emulation component 140 can include representing the first logical storage area 160 as an auto-launch device and representing the second logical storage area 170 as a device including a writable data storage medium. Accordingly, the data source 110 will recognize the data backup system 100 as two attached devices when connected to the backup system 100. It should be noted, however, that in some embodiments the contents of these two devices are not accessible to the user of the data source but are accessible by the backup application which is configured with appropriate application programming interface (API) calls. This serves to protect the contents of both the first and second logical storage areas from accidental modification or erasure. To access the backed up data from the second logical storage area 170 in some embodiments, the data backup system 100 restores the data to the data source or copies the data to yet another device. In other embodiments, the virtual device that represents the second logical storage area 170 is accessible to the user while the virtual device that represents the first logical storage area 160 is not accessible. In these embodiments, the user is allowed direct access to the contents of the second logical storage area 170 but not the first logical storage area 160.

Another function that can be provided by the emulation component 140 is translating commands and responses between formats, such as between the command sets for a HDD and a CD drive. In this way, when the data source 110 sends a command to the backup system 100 addressed to the auto-launch device (as the first logical storage area 160 is represented to be), the emulation component 140 translates the command from an auto-launch device format to the appropriate format for the storage device 150, before sending the command to the first logical storage area 160. Similarly, responses from the first logical storage area 160, in the format of the storage device 150, are translated into the auto-launch device format and sent to the data source 110 so the response appears to have come from an auto-launch device.

It should be noted that translation between CD drive and HDD formats is but one example, and in some embodiments the emulation component 140 can implement one or more analogous format translations. As used herein, a "storage device command" refers to a command in an appropriate format for the specific storage device, and a "storage device response" refers to a response in the same format. As a specific example, an "auto-launch device command" refers to a command in an appropriate format for a specific auto-launch device, and an "auto-launch device response" refers to a response in the same format.

Still another function that can be provided by the emulation component 140 is to pass commands and responses between the data source 110 and the second logical storage area 170. When the commands received by the emulation component 140 are already in the proper format for the storage device 150, the emulation component 140 does not have to translate commands or responses. Here, the emulation component 140 receives commands from the data source 110 addressed to the device that includes the writable data storage medium and passes the commands to the second logical storage area 170. In a similar fashion, responses are relayed back to the data source 110 without translation. It will be appreciated that the emulation component 140 can be configured to represent the second logical storage area 170 as being of a different type of device than the memory device 150. In these embodiments, the emulation component 140 is configured to translate between the formats of the memory device 150 and the device type of the representation of the second logical storage area 170.

Figure 2:
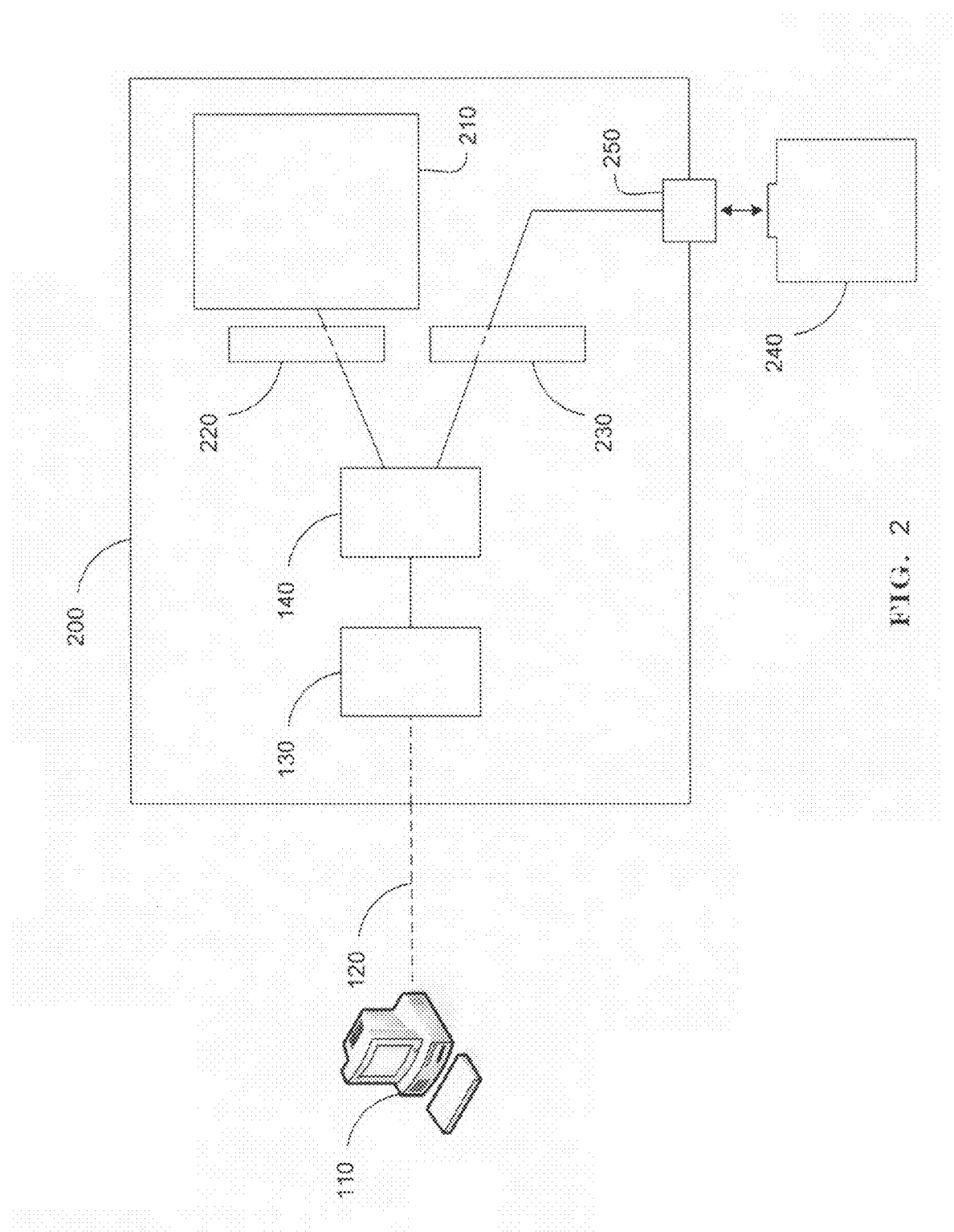
FIG. 2 is a schematic representation of a data backup system according to another exemplary embodiment of the present invention.

FIG. 2 provides a schematic representation of another exemplary embodiment of a data backup system 200 that, like the data backup system 100, is connected to the data source 110 by the connection 120. Also like the data backup system 100, the backup system 200 comprises the communication interface 130, and the emulation component 140. In this embodiment, the backup system 200 also comprises storage device 210 including a writable data storage medium and an appropriate memory device interface 220. Since the writable data storage medium of the storage device 210 only needs to include enough memory capacity to store a backup application and the like, the backup system 200 can be of a fairly small form factor, such as pocket-sized or a dongle, or be embedded in some other device configuration such as a dock or a cradle.

The data backup system 200 can also comprise a removable storage device interface 230 to allow a removable storage device 240, including a writable data storage medium, to be attached externally to the data backup system 200 by way of a communication port 250. The removable storage device interface 230 provides communication between the emulation component 140 and the removable storage device 240. In some embodiments the removable storage device interface 230 is configured to support a removable device with an integrated medium such as a flash memory device or a HDD. In other embodiments, the removable device can be one that accepts removable media, such as a CD drive.

It will be appreciated that the removable storage device interface 230 is optional as the copied files do not necessarily have to be stored to a memory device that is associated with the data backup system 200. Alternately, the backup application can direct copied files to be stored to an existing internal or external drive of the data source or to a networked drive. In still another option, the backup application can send copied files over an Internet connection to be stored at a web-based storage facility.

It should be noted that the backup systems 100, 200 can include a display or other visual indicator such as a light emitting diode (LED) to show files being copied, for instance, though some embodiments do not include the display to lower the cost and increase the durability of the backup systems 100, 200. The backup systems 100, 200 can run off of a battery, an external power source (e.g., an AC power outlet), or off of power supplied by the data source 110. In some embodiments, the connection 120 is a cable that is part of the backup system 100, 200. The backup systems 100, 200 can also be configured as a cradle designed to receive the removable storage device 240 or the data source 110 where the data source 110 is a consumer electronic device such as a digital camera.

Figure 3:
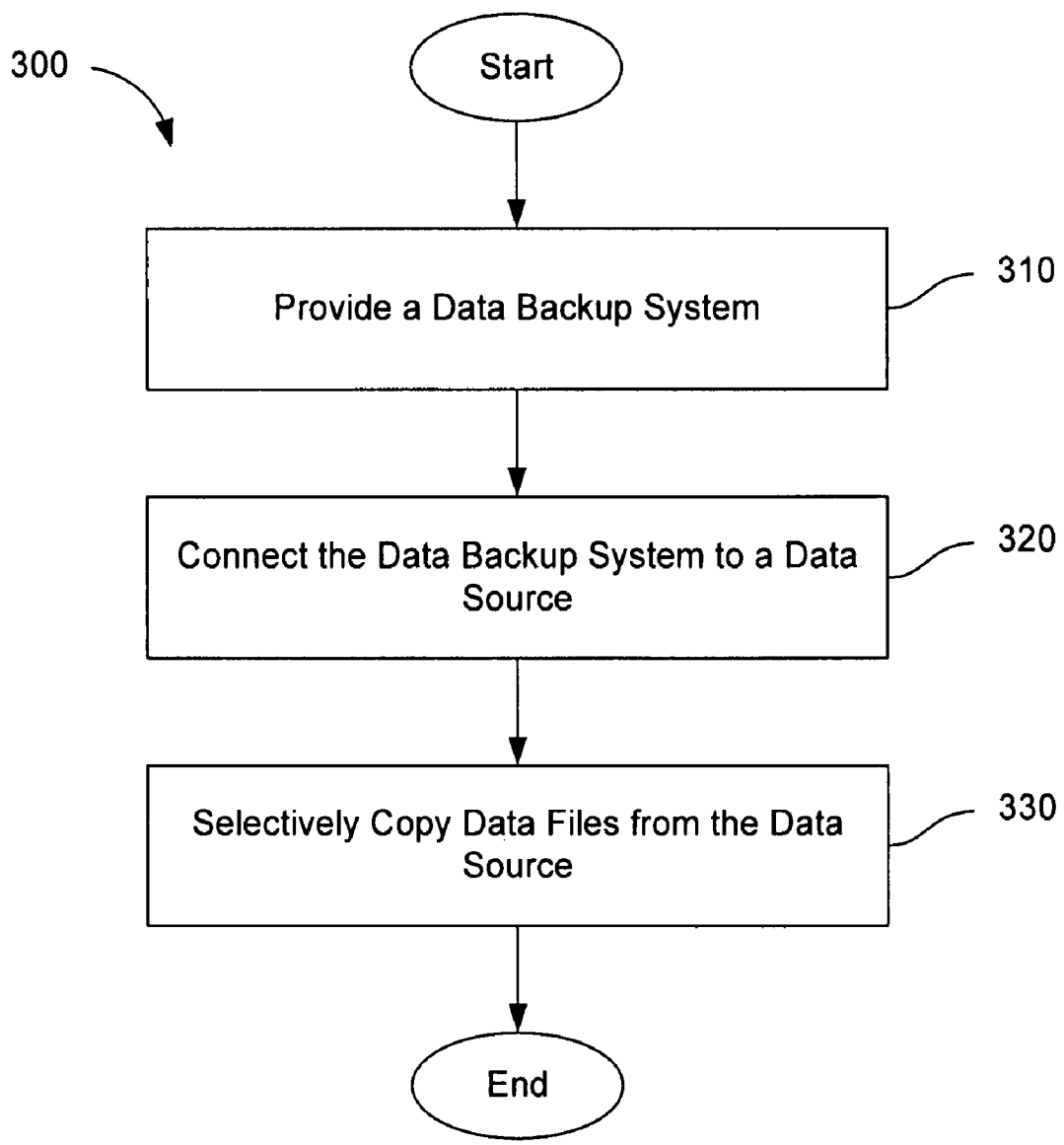
FIG. 3 is a flow-chart representation of a method for backing up data files on a data source according to an exemplary embodiment of the present invention.

FIG. 3 is a flow-chart representation of an exemplary method 300 for backing up data files from a data source. The method 300 comprises providing 310 a data backup system including a storage device storing a backup application, connecting 320 the data backup system to the data source to automatically launch the backup application, and selectively copying 330 the data files from the data source.

Providing 310 the data backup system can include providing data backup system 100 or data backup system 200, for example. In those embodiments in which the data backup system 200 is used, providing 310 the data backup system 200 can include, for example, connecting a removable storage device 240 to the communication port 250. Where the removable storage device 240 is, for example, a SD or CF memory card, connecting the removable storage device 240 to the communication port 250 can include inserting the memory card into the communication port 250. Alternately, where the removable storage device 240 is a HDD, connecting the removable storage device 240 to the communication port 250 can include coupling the communication port 250 to the removable storage device 240 with a connection such as a cable or a wireless link.

With reference to data backup systems 100, 200, connecting 320 the data backup system 100, 200 to the data source 110 can include coupling the communication interface 130 to the data source 110 with the connection 120. Connecting 320 the data backup system to the data source also includes the data source recognizing the data backup system as two new devices. For example, some operating systems periodically query unused ports for newly attached hardware. An exemplary process by which the data backup system 100, 200 can be recognized by the data source 110 as being two attached devices is described below with respect to FIG. 4.

Connecting 320 the data backup system to the data source automatically launches a backup application. Operating systems that include an automatic execution function, such as the AutoRun capability of the Windows operating system, can execute applications that are resident on an auto-launch device. Here, the automatic execution function of the data source's operating system recognizes the backup application as an application to be launched, and automatically launches the backup application to run on the data source.

Connecting 320 the data backup system to the data source can also comprise translating commands and responses between device formats as communications are passed between the data source and the data backup system, as discussed above with respect to the functionality of the emulation component 140. Thus, for example, CD read commands sent to the backup system 100 are translated to HDD read commands before being sent to the first logical storage area 160.

Selectively copying 330 the data files from the data source can include running the backup application on the data source, where the backup application is configured to search one or more storage devices associated with the data source. The backup application can, in some embodiments, search directories of internal storage devices, external storage devices, and network drives that are accessible to the data source. The backup application selectively copies files to a storage device including a writable data storage medium such as the second logical storage area 170 or the removable storage device 240.

The backup application selects files that meet at least one criterion, such as file type (e.g., .jpg) or type of content (e.g., audio files). The backup application can also find files that meet at least one of several criteria. Other examples of types of content include e-mails, business application data (e.g., Accpac and Simply Accounting files), digital video files, ebook files, contacts files, calendar files, text files, tasks files, settings files, bookmark files, and password files. Another criterion, in some embodiments, is whether a file has been previously backed up. Yet another criterion can be a particular date or a range of dates. The backup application, in some embodiments, finds files that meet the criteria by searching e-mail attachments and files embedded within other files, such as compressed files within a .zip file. The backup application can find files that are stored directly on the data source, or additionally on associated peripheral devices and networks.

The backup application can, in some embodiments, create a file path or directory structure on the writable data storage medium of the data backup system to indicate the location where a copied file was located on the data source. In other embodiments, the backup application creates a new directory structure based on chronological order, alphabetical order, file size, or some other criteria. Another alternative is for the backup application to create a monolithic file that includes all of the backed up files. Yet another alternative is for the backup application to store on the writable data storage medium the backed up files in a common directory (i.e., a flat structure) and to create an index (e.g. an XML index) that stores the information on file locations. In these embodiments, when the backed up files are restored the index is used to re-create the directory structure on the data source.

It will be appreciated that according to the method 300, user involvement can be reduced to simply making a physical connection between a data backup system and a data source. While user involvement can be reduced to one or more simple operations, it will be appreciated that options can be provided to the user through a graphical user interface (GUI) provided by the backup application on a display device of the data source. In this way the user, if desired, can customize the backup process by specifying search criteria such as a type of content or a file type to be copied. Additionally, the user can limit the scope of the backup process by drive, directory, folder, file type, file size, or date/time stamp, or the user can deselect a type of content or a specific file, drive, directory, or folder such as a temporary folder or an Internet Explorer directory.

As noted, selectively copying 330 the data files from the data source can include running the backup application on the data source. In addition to the above functions of the backup application, the backup application can also be configured to perform the following functions as part of selectively copying 330 the data files. For example, the backup application can wait a predetermined length of time and then repeat the backup process so long as the backup system remains connected to the data source 110. The backup application can also perform a self-diagnostic routine at predetermined intervals. The backup application can also be configured to wait for a predetermined period of time before performing an automatic backup to provide the user an opportunity to customize the backup process. Additionally, the backup application can be configured to selectively copy 330 the data files only upon a user command, rather than automatically. The user command can be entered through the GUI on the data source, or can be provided by a button or switch on the data backup system. Alternately, the backup application can be configured to selectively copy 330 the data files whenever a removable storage device 240 is connected to the communication port 250.

Copying 330 the data files, in some embodiments, includes determining whether the data source has been previously paired with the data backup system (e.g., the data source was previously backed up with the data backup system). This can include, for example, searching for a marker that was previously left on the data source, or comparing a marker saved on the data backup system with an identifier of the data source such as a volume label. The marker allows the backup application to recognize the data source. In some embodiments, the backup application determines a course of action based on whether the data source has been previously paired with the data backup system and if so, whether the data backup system already stores data associated with the data source. For instance, the course of action can be an automatic backup of the data source, either full or incremental, a restoration of backed up data to the data source, or a query to the user to make a selection between these or other alternatives.

Figure 4:
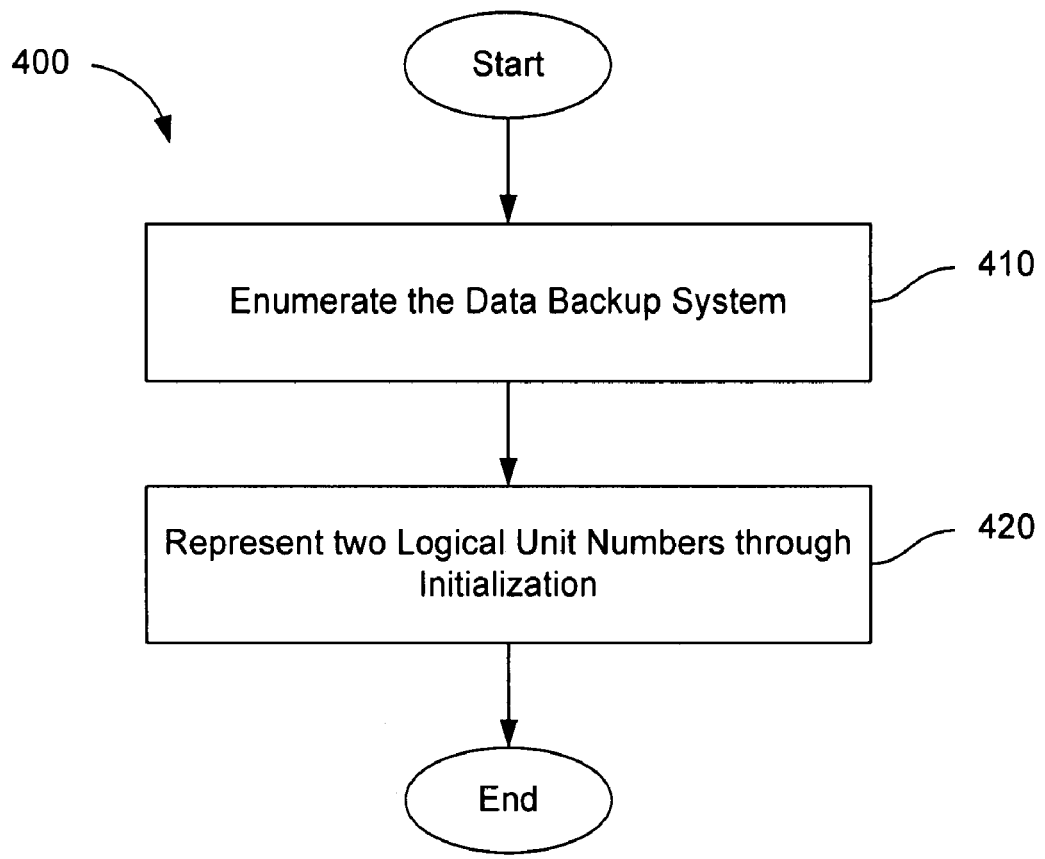
FIG. 4 is a flow-chart representation of a process by which a data backup system can be recognized by the data source as being two attached devices according to an exemplary embodiment of the present invention.

FIG. 4 is a flow-chart representation of an exemplary method 400 by which the data backup system, once detected, becomes recognized as two attached devices by the data source. Although this exemplary method 400 is described with reference to USB protocols, it will be understood that other protocols such as FireWire follow analogous processes. The method 400 comprises the data source enumerating 410 the data backup system, followed by the emulation component of the data backup system representing 420 two Logical Unit Numbers (LUNs) through initialization.

Enumerating 410 the data backup system is performed to identify the newly attached hardware, in this case the data backup system, and how the hardware is configured for communication. Enumerating 410 comprises the data source assigning a unique device number and querying the data backup system for a device descriptor. The emulation component responds by providing a device descriptor to the data source. Enumerating 410 further comprises the data source setting an address for the data backup system. Once the address has been set, the data backup system obtains communication frames assigned to the address. Enumerating 410 can also comprise the data source requesting and receiving detailed device information from the data backup system, specifically the emulation component, such as class, subclass, and protocol.

Enumerating 410 also comprises the data source starting an appropriate USB mass storage class driver, and the USB mass storage class driver requesting the number of LUNs from the data backup system with a "GET MAX LOGICAL UNIT NUMBER" command. Enumerating 410 also comprises the data backup system, and more specifically the emulation component, responding to the "GET MAX LOGICAL UNIT NUMBER" command by communicating two LUNs to the data source.

Representing 420 the two LUNs through initialization comprises the emulation component receiving a number of SCSI commands directed to each LUN from the data source. The emulation component handles each LUN independently. The emulation component responds to those SCSI commands that it recognizes, and generates a standard error condition in response to SCSI commands that are not recognized. Each SCSI command, and any errors that are generated, are typically handled before the next SCSI command is issued to either LUN. It will be understood that the sequence of SCSI commands sent to the LUN representing a storage device including a writable data storage medium can be different from those sent to the LUN representing an auto-launch device. Additionally, SCSI commands, or a sequence of SCSI commands, may be repeated multiple times by the data source, and sequences of SCSI commands directed to the two LUNs can be interlaced.

For both LUNs, the sequence of SCSI commands starts with the USB mass storage class driver issuing an "INQUIRY" command to identify the device type. The emulation component returns a response to represent a storage device, such as second logical storage area 170 (FIG. 1), as a storage device that can include a writable data storage medium. A response of "0x00, " for example, indicates that the storage device is a HDD. Similarly, the emulation component returns a response to represent a storage device, such as first logical storage area 160 (FIG. 1) as an auto-launch device. A response of "0x05, " for instance, indicates that the auto-launch device is a CD drive. The storage device that can include a writable data storage medium can additionally be marked as either "removable" or "non-removable," while the auto-launch device can be marked as "removable." After this point, the sequence of SCSI commands for the two LUNs diverge. It will be appreciated that the order of SCSI commands in the sequences described below are exemplary, and the order of the SCSI commands will vary with different data sources. Also, in some instances one or more of the SCSI commands provided below are omitted, and/or other SCSI commands are included.

An exemplary sequence of SCSI commands directed to the storage device that includes the writable data storage medium continues with a "READ FORMAT CAPACITIES" request that the data source uses to determine whether the writable data storage medium is unformatted. Ordinarily, the medium of the storage device being represented is already formatted, and the emulation component responds accordingly. Otherwise, the data source will attempt to format the medium of the storage device. Next, the data source issues a "READ CAPACITY" request to identify the capacity of the writable data storage medium and its block size, and the emulation component returns this information as well. A "READ(10)" command is issued to read the first block on the writable data storage medium. The first block has a logical block addressing (LBA) value of zero (LBA=0) and contains the Master Boot Record (MBR), which itself contains the partition table for the writable data storage medium. The emulation component responds with the contents of the requested block.

A "MODE SENSE(6)" command is then used to extract the capabilities of the storage device including the writable data storage medium, such as whether the storage device contains a disk cache. The emulation component replies as appropriate to the capabilities of the storage device being represented. Another "READ(10)" command is issued to recover the first block of the file system that contains the root directory. The first block of the file system can be located at LBA=0x3F, for example, but can vary depending on the particular type of file system being represented. The emulation component returns the first block of the file system. Finally, the data source can issue a "TEST UNIT READY" request before reading the full contents of the root directory, etc. Here, the emulation component responds affirmatively so that the data source will regard the storage device that includes the writable data storage medium as operational. The data source thereafter issues more read/write requests as necessary.

An exemplary sequence of SCSI commands directed to the auto-launch device continues with a "GET CONFIGURATION" request to obtain information about the capabilities of the auto-launch device and its ability to read or write different types of optical media, e.g., CD-R, CD-RW, DVD-R, DVD+R, DVD-RW, DVD+RW, etc. The emulation component responds with capabilities that are appropriate for the auto-launch device being represented to the data source. This can be followed by a "READ CAPACITY" request to discover if there is a medium present in the auto-launch device. The emulation component is configured to respond by failing the initial attempt. In response, the data source will issue a "REQUEST SENSE" command to access the extended error information. In the reply, the emulation component sets the "Sense Key" to "UNIT ATTENTION," and sets the "Additional Sense Code" to "POWER ON." The data source will then repeat the "READ CAPACITY" request, and the emulation component will respond with a capacity, such as the size of the first logical storage area 160 (FIG. 1).

To learn what types of status change events the read-only media device supports, the data source issues an initial "GET EVENT STATUS NOTIFICATION" request, and the emulation component responds with a set of coded status fields. The data source can then repeat the "GET EVENT STATUS NOTIFICATION" request, with a field set to a status entry to be checked. If the operational status field is enabled, for example, the emulation component will respond with an operational change event, and a status code representing a feature change. This response can trigger the data source to issue further "GET CONFIGURATION" request(s), to discover which feature, if any, has changed.

The data source can also issue a "MODE SENSE(10)" request for Page Code (0x2A), known as the "MM Capabilities and Mechanical Status Page." The emulation component will respond with information that is typical for a simple auto-launch device that includes read-only support for CD-R and CD-RW media. This echoes the information that is returned in response to the "GET CONFIGURATION" request.

At this point, the data source can issue a "TEST UNIT READY" command. This triggers two sequences of request/response events in the emulation component that can support the automatic execution functionality of different operating systems. The commands in the two sequences can be interlaced, and the events will remain pending until the emulation component has passed through all of the expected states. As outlined below, both sequences are typical for an operating system such as Windows XP. The sequences, below, do not account for the number of times that a request, or a sequence of requests, can be repeated. Also, the particular sequence of events can vary depending on the type and version of the operating system executing on the data source. Additional or substitute commands can also be issued.

The first sequence comprises a series of "TEST UNIT READY" commands from the data source to the auto-launch device. The emulation component is configured to fail the first request. The data source then sends a "REQUEST SENSE" command to obtain the extended error information, and the emulation component sets the sense key to "NOT READY," with an additional sense code of "MEDIUM NOT PRESENT." The data source then repeats the "TEST UNIT READY" command, which the emulation component again fails. The data source again sends a "REQUEST SENSE" command and the emulation component responds with a sense key set to "UNIT ATTENTION," and an additional sense code of "MEDIUM MAY HAVE CHANGED." All subsequent "TEST UNIT READY" commands are typically responded to without error.

The second sequence comprises a series of "GET EVENT STATUS NOTIFICATION" requests from the data source to the auto-launch device. Following the first "TEST UNIT READY" command that triggers the first sequence, the data source issues a "GET EVENT STATUS NOTIFICATION" request with the operational change field enabled. The emulation component responds with an operational change event and a status code representing a feature change. On the following "GET EVENT STATUS NOTIFICATION" request the media status field is enabled. The emulation component responds with a media event, a status code representing new media, and a flag set to indicate that the media is present. On all subsequent "GET EVENT STATUS NOTIFICATION" requests where the media status field is enabled, the emulation component responds with a media event and with the media present flag set, but the status code will not indicate new media. In the case where a "GET EVENT STATUS NOTIFICATION" request is issued, and the expected status field is not enabled, the emulation component responds as appropriate for the current state of that event.

At the end of either or both of these sequences, the data source can send a "READ TOC/PMA/ATIP" request to read the Table Of Contents (TOC) from the medium of the auto-launch device. The TOC includes information on the number of tracks on the medium, and the start position of each. The emulation component responds with entries for a default configuration, namely, a single data track that starts immediately after the "lead-in" area. The default TOC declares that the first block of data on the medium starts at address zero. The position of a last track is fixed in the emulation component and represents the space allocated to the data on the auto-launch device, such as the backup application.

When the data source makes a read request of the auto-launch device, the emulation component automatically translates the logical address into a corresponding physical address of the storage device (e.g., first logical storage area 160 (FIG. 1)) that is being represented as the auto-launch device. In addition, where the block sizes of the storage device (e.g., a HDD partition) that is being represented as the auto-launch device (e.g., a CD drive) are different, the emulation component also translates the required amount of auto-launch device data into the appropriate number of blocks on the storage device.

After the method 400 has been completed, the data source recognizes one LUN as an auto-launch device and another LUN as a storage device including a writable data storage medium and is properly configured to communicate independently with each. Thereafter, selectively copying 330 the data files from the data source can commence. As described above, this can include the operating system of the data source automatically launching a backup application from the LUN being represented as the auto-launch device, and writing selected data from the data source to the LUN being represented as the storage device including a writable data storage medium.

Another data backup device is also provided for personal, as well as commercial, applications. The data backup device of the present invention allows files to be selectively copied from a data source, such as a personal computer, to the data backup device according to some criterion such as file type. For example, the device can be configured to backup audio files having recognized music file extensions such as .mp3 and .wav, or image files having recognized image file extensions such as .jpg, .pct, and .tif. The data backup device stores a backup application that automatically launches when the data backup device is connected to the data source. The backup application can be configured to require little or no user input to perform the backup process. The data backup device can take the form of a hybrid optical disc divided into sections characterized by different media formats. Although the example of a hybrid optical disc is used for explanatory purposes herein, it will be appreciated that the invention is not limited to hybrid optical discs as is explained further herein.

Figure 5:
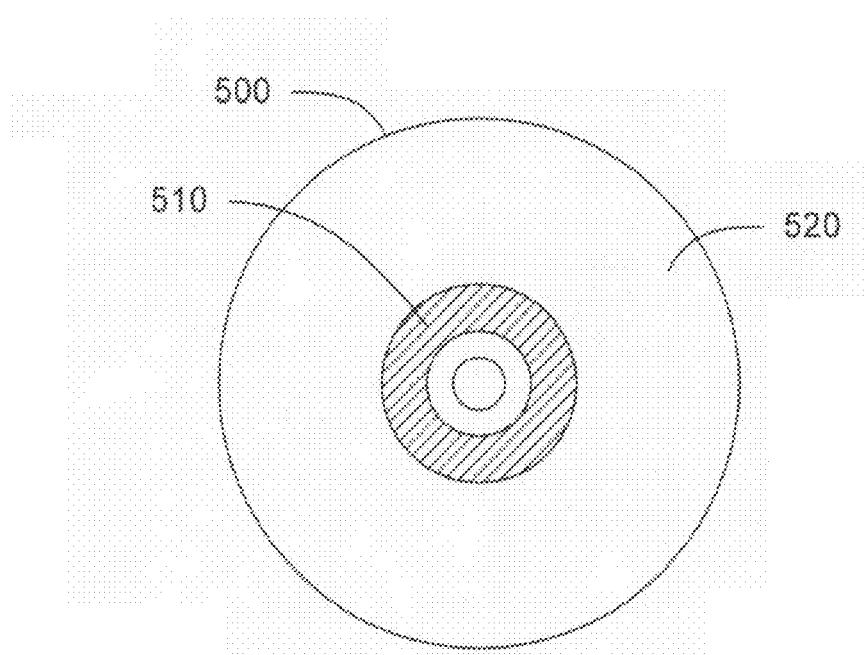
FIG. 5 is a top view of an exemplary optical disc according to an embodiment of the present invention.

FIG. 5 provides a schematic representation of an optical disc 500 comprising two portions, a read-only portion 510 and a writable portion 520. The portions 510, 520 can comprise either the same or different media formats. The read-only portion 510 includes computer-readable instructions for backing up data onto the writable portion 520. These computer-readable instructions can include, for example, a backup application, a directory structure, system files, drivers, application programming interfaces (APIs), and other setup and configuration software.

As noted, the portions 510, 520 can comprise either the same or different media formats. In those embodiments where the portions 510, 520 of the optical disc 500 comprise the same media format, the media format is one that can only be written once. Examples of write-once media formats include Compact Disc-Recordable (CD-R), DVD-Recordable (DVD-R and DVD+R), DVD-Recordable Dual Layer (DVD-R DL and DVD+R DL), Blu-ray disc Recordable (BD-R), and High-Density Digital Versatile Disc (HD-DVD) formats. These media formats are defined in various industry standards known in the art such as the Orange Book Recordable Compact Disc Standard developed by Philips and Sony.

In these embodiments, the read-only portion 510, having computer-readable instructions already written thereto, cannot be rewritten, whereas the writable portion 520 remains initially unwritten.

Optical discs 500 having portions 510, 520 comprising different media formats are referred to herein as hybrid optical discs. Where the optical disc 500 comprises a hybrid optical disc, suitable media formats for the read-only portion 510 include CD-ROM and DVD-ROM formats where the computer-readable instructions are placed on the read-only portion 510 by stamping. Other suitable media formats for the read-only portion 510 include the write-once media formats listed above where the computer-readable instructions are written to the read-only portion 510. In hybrid optical disc embodiments, the writable portion 520 can either comprise a write-once media format, or a rewritable media format such as Compact Disc-Rewritable (CD-RW), DVD-Rewritable (DVD-RW and DVD+RW), DVD-Rewritable Dual Layer (DVD-RW DL and DVD+RW DL), Blu-ray disc Re-writeable (BD-RE), and DVD Random Access Memory (DVD-RAM). The writable portion 520 can either be initially unwritten or, if the writable portion 520 comprises a rewritable format, can include computer-readable instructions that can be overwritten with data files.

It will be appreciated that the portions 510, 520 can also be distributed across the layers of a multi-layered optical disc 500. In one example, the read-only portion 510 is disposed on a first layer of a dual layer optical disc 500, such as a CD-ROM layer, and the writable portion 520 is disposed on a second layer, such as a DVD-R layer. As another dual layer example, both layers can comprise the DVD-R format with only a segment of a first layer comprising the read-only portion 510. In this example the remainder of the first layer, as well as a second layer, comprise the writable portion 520. In other embodiments, the different layers comprise different media formats, for instance, a triple layer optical disc 500 can comprise a CD-ROM layer, a DVD-R layer, and a DVD+R layer. In this example, the CD-ROM layer comprises the read-only portion 510 and the DVD-R and DVD+R layers comprise the writable portion 520. Providing both DVD-R and DVD+R formats on a single optical disc 500 can be particularly advantageous as many optical drives are configured to write to one of the two formats but not the other.

The following list provides examples of media format combinations that can be implemented for either a single-layer optical disc 500, where the two media formats are provided in a side-by-side configuration, or for a dual-layer optical disc 500 where the each media format is provided as a separate layer. Although the following list is extensive, the list is not meant to be exhaustive: CD-ROM/CD-R; CD-ROM/CD-RW; CD-ROM/CD+RW; CD-ROM/DVD-R; CD-ROM/DVD+R; CD-ROM/DVD-RW; CD-ROM/DVD+RW; CD-ROM/DVD+R DL; CD-ROM/BD-R; CD-ROM/BD-RE; CD-ROM/HD-DVD; DVD-ROM/DVD-R; DVD-ROM/DVD+R; DVD-ROM/DVD-RW; DVD-ROM/DVD+RW; DVD-ROM/DVD+R DL; DVD-ROM/BD-R; DVD-ROM/BD-RE; and DVD-ROM/HD-DVD-R. Additional media format combinations that can be implemented as the layers of a three-layer optical disc 500 include: CD-ROM/DVD-R/DVD+R; CD-ROM/DVD-RW/DVD+RW; DVD-ROM/DVD-R/DVD+R; DVD-ROM/DVD-RW/DVD+RW; CD-ROM/BD-R/HD-DVD-R; CD-ROM/BD-RE/HD-DVD-R; DVD-ROM/BD-R/HD-DVD-R; and DVD-ROM/BD-RE/HD-DVD-R. As above, this list of three-layer media format combinations is not meant to be exhaustive.

Figure 6:
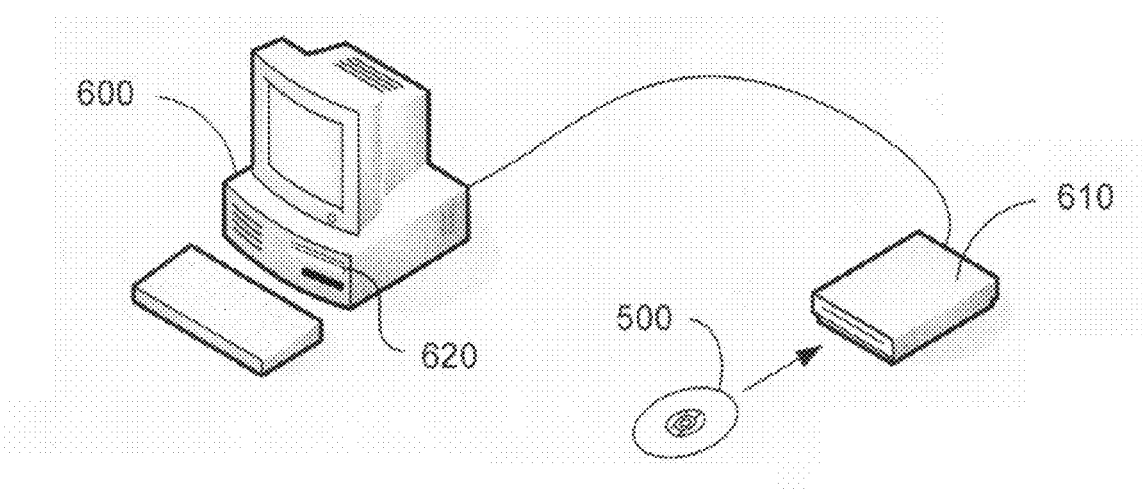
FIG. 6 is a perspective view of an exemplary system comprising a data source with an internal optical drive and an attached external optical drive for receiving an optical disc according to an embodiment of the present invention.

FIG. 6 shows a system comprising an exemplary data source 600 connected to an external optical drive 610 for reading from and writing to (i.e., "burning") the optical disc 500. The data source 600 can alternatively or additionally include an internal optical drive 620 for the same purpose. Optical drives 610, 620 that have the ability to both read and write data are commonly referred to as "writers" or "burners."

The data source 600 can be, for example, a personal computer (PC), a Macintosh computer (Mac), or a Personal Digital Assistant (PDA) on which data resides. The data source 600 can also comprise a server, a settop box, a television, a cellular telephone, a Smartphone, a digital still camera or video camera, a scanner, a digital music or video player, a game console, or a Personal Video Recorder (PVR). Preferably, the data source 600 includes an operating system (OS), such as Windows XP, that includes an automatic application launching function, as discussed in more detail elsewhere herein. Other suitable operating systems include Mac OS, Palm OS, Linux, and Unix, for example. The data source, in some embodiments, can also be configured to access the Internet and/or include other peripheral devices (not shown), especially for data storage such as hard disc drives, solid state memory devices like compact flash (CF), and/or a storage area network (NAS).

As used herein, auto-launch devices are those devices that will trigger the automatic execution functionalities of certain operating systems, such as the AutoRun function of the Microsoft Windows operating systems. Examples of device types that will trigger AutoRun of Windows include CD and DVD drives when a CD or DVD medium is contained therein. In these examples, the Windows AutoRun functionality is triggered when either a CD or DVD medium is placed in either of the optical drives 610, 620, or when the optical drive 610, already containing a CD or DVD medium, is connected to the data source 600. The AutoRun function in Windows XP is used herein as merely an example of the automatic application launching functions that are made available by other operating systems, and the invention is not limited to the Windows environment.

Figure 7:
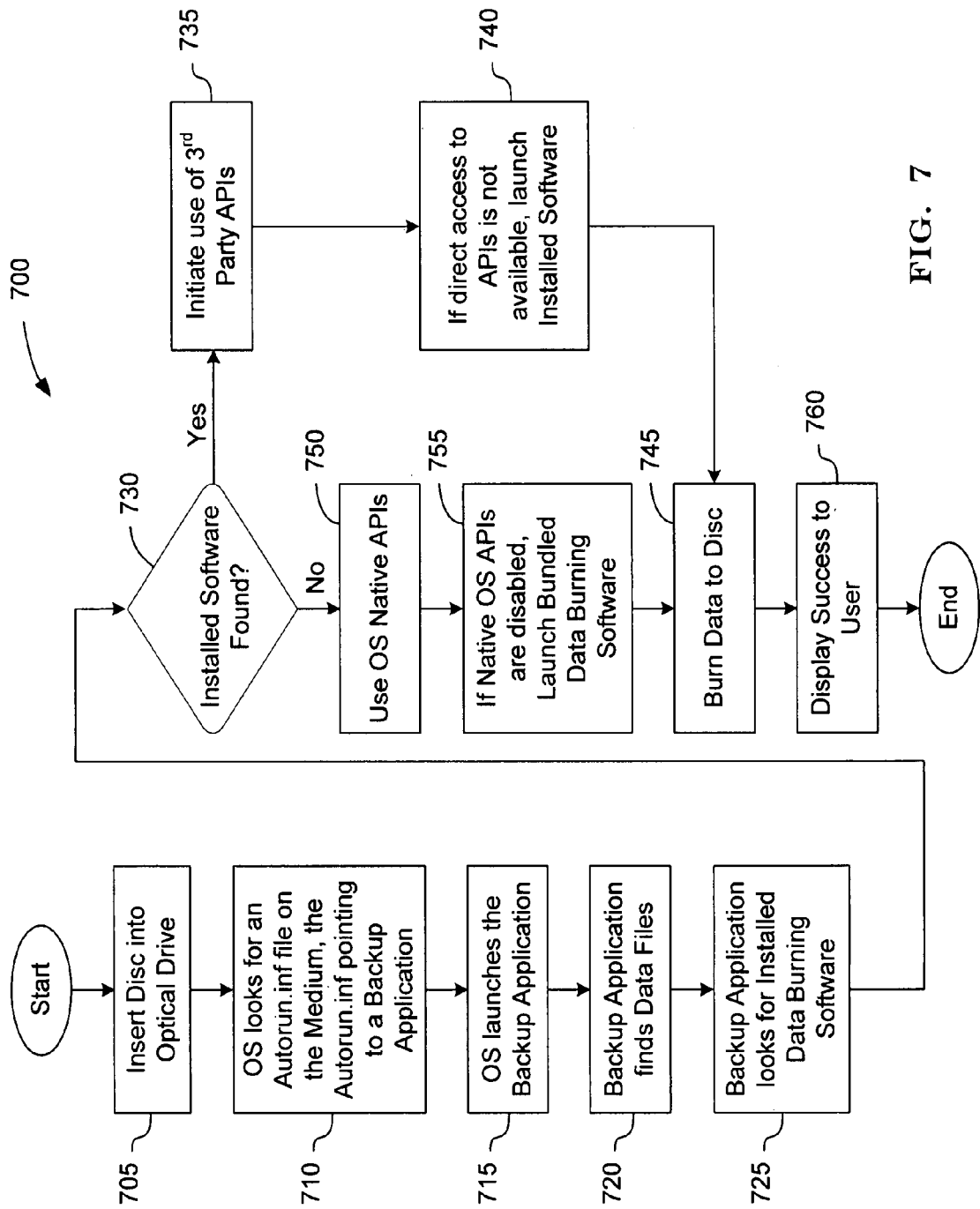
FIG. 7 is a flow-chart representation of an exemplary method for backing up data files from a data source onto a writable portion of an optical disc according to an embodiment of the present invention.

FIG. 7 is a flow-chart representation of an exemplary method 700 for backing up data files from the data source 600 onto the writable portion 520 of the optical disc 500. The method 700 comprises inserting 705 the optical disc 500 into either of the optical drives 610 or 620. In this embodiment, the Windows operating system detects the insertion event and looks 710 for an Autorun.inf file on the optical disc 500, and more specifically, within the root directory of the computer-readable instructions on the read-only portion 510. In the example, the Autorun.inf file points to a backup application within the computer-readable instructions on the read-only portion 510. Because the backup application is listed in the Autorun.inf file, the Windows operating system automatically launches 715 the backup application to run on the data source 600.

The backup application finds 720 files that meet one or more predefined criteria, such as file type (e.g., .jpg) or type of content (e.g., audio files). The backup application can also find 720 files that meet at least one of several predefined criteria. Other examples of types of content include e-mails, business application data (e.g., Accpac and Simply Accounting files), digital video files, ebook files, contacts files, calendar files, text files, tasks files, settings files, bookmark files, and password files. Another criterion, in some embodiments, is whether a file has been previously backed up. Still other can be a particular date or a range of dates. The backup application, in some embodiments, finds 720 files that meet the predefined criteria by searching e-mail attachments and files embedded within other files, such as compressed files within a .zip file. The backup application can find 720 files that are stored directly on the data source 600, or additionally on associated peripheral devices and networks.

One advantage of the invention is the simplicity of use of the optical disc 500 for selectively backing up a particular type of content, such as images or music. It will be appreciated that a user's involvement can be reduced to inserting 705 the optical disc 500 into either of the optical drives 610 or 620, and from that point forward the back-up method 700 continues automatically. Accordingly, the backup application can be configured to back up those data files that include a particular type of content, such as images. This allows embodiments of the optical disc 500 to be packaged and sold as a specialty data backup device for automatically backing up a single type of content onto the data backup device. In this way, the optical disc 500 can be viewed as a device that takes and stores a snapshot of a type of content on the data source 600. Additionally, a set of optical discs 500 can be provided together where each is a specialty data backup device dedicated to a different type of content such that the set covers the types of data files most commonly found on data sources 600. Thus, an exemplary set includes one optical disc 500 for backing up Microsoft Office files, one optical disc 500 for backing up music files, one optical disc 500 for backing up image files, and one optical disc 500 for backing up video files.

With continued reference to FIG. 7, the backup application looks 725 for installed data burning software and determines 730 whether installed data burning software is present. If already installed data burning software is present on the data source 600, the operating system initiates the use 735 of 3rd party Application Programming Interfaces (APIs). If direct access to the 3rd party APIs is not available, the installed software is launched 740. The files found 720 can then be written 745 by the installed software to the writable portion 520 of the optical disc 500. If installed software is not found, the Windows OS native APIs are used 750. If the Windows OS native APIs are disabled, bundled data burning software optionally included as part of the computer-readable instructions on the read-only portion 510 is launched 755 and the found files can then be written 745 by the bundled software. It will be understood that although looking 725 for installed data burning software is shown in FIG. 7 as sequentially following finding 720 files, looking 725 for installed data burning software and finding 720 files take place concurrently in some embodiments.

In some embodiments, writing 745 the files includes creating a file path or directory structure on the writable portion 520 to indicate the location where a copied file was located on the data source 600. In other embodiments, the backup application creates a new directory structure based on chronological order, alphabetical order, file size, or some other criteria. Another alternative is for the backup application to create a monolithic file that includes all of the backed up files. Yet another alternative is for the backup application to store on the writable portion 520 the backed-up files in a common directory (i.e., a flat structure) and to create an index (e.g. an XML index) that stores the information on file locations. In these embodiments, when the backed-up files are restored the index is used to re-create the directory structure on the data source 600.

As noted above, a user's involvement in the method 700 can be reduced to simply inserting 705 the optical disc 500 into either optical drive 610, 620. Once the backup application has successfully completed the data backup, a message indicating successful completion can be displayed 760 to the user by a GUI provided by the backup application on a display device of the data source 600. It will be understood, however, that other embodiments provide options to the user through the GUI so that the user, if desired, can customize the backup process prior to the backup application finding 720 data files. As one example, the user can customize the backup process by specifying one or more search criteria. The use can specify a search criterion by making a selection from a set of choices, for example, as presented in a drop-down menu. As another example, the user can customize the backup process by specifying one or more search criteria by entering the criteria in a text box. Additionally, the user can limit the scope of the backup process by drive, directory, folder, file type, file size, or date/time stamp, or the user can deselect a type of content or a specific file, drive, directory, or folder such as a temporary folder or an Internet Explorer directory. Additional user involvement is discussed below.

Figure 8:
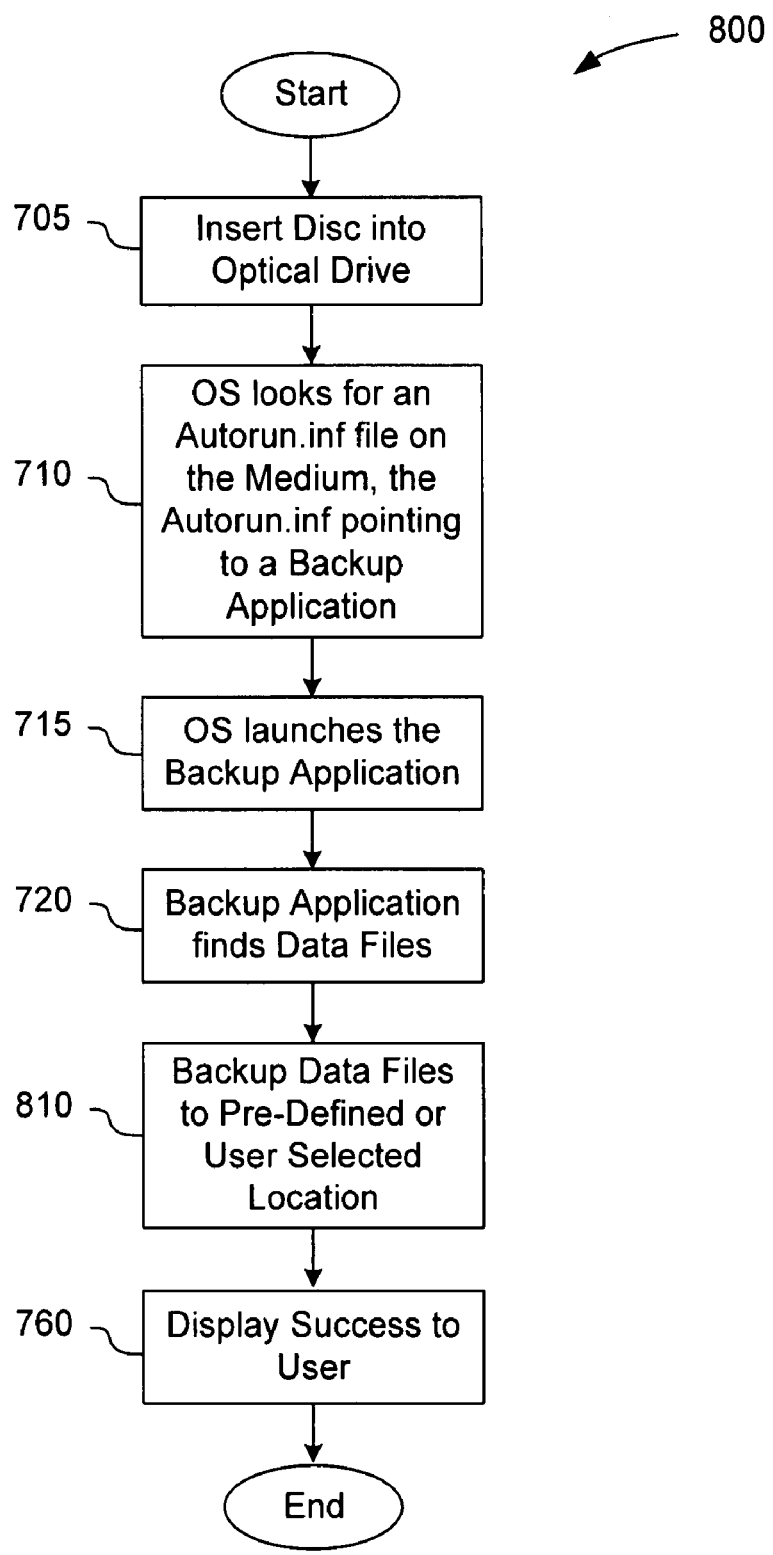
FIG. 8 is a flow-chart representation of an exemplary method for backing up data files from the data source according to another embodiment of the present invention.

FIG. 8 is a flow-chart representation of still another exemplary method 800 for backing up data files from the data source 600. The method 800 does not require the use of the optical disc 500 as the method 800 backs up the data files to storage options other than optical discs 500. The method 800 begins with inserting 705 an optical disc into either of the optical drives 610 or 620. In the method 800 the optical disc can be the optical disc 500, but can also be any optical disc that can be read by either of the optical drives 610, or 620 and that comprises computer-readable instructions including the backup application. For the purposes of method 800, the optical disc does not need to have a writable portion. In some embodiments, the optical disc including the computer-readable instructions is a CD-ROM or DVD-ROM.

As in the embodiments described above with respect to FIG. 7, the Windows operating system looks 710 for the Autorun.inf file that points to the backup application. The Windows operating system auto-launches 715 the backup application to run on the data source 600. The backup application then finds 720 data files to be backed up. Next, the backup application backs up 810 the found data files to either a pre-defined location or a user-specified location. In the case of a user-specified location, the backup application prompts the user to specify a backup destination and waits for a response. The user can specify, for example, a network drive, an attached storage drive, a memory card, Network Attached Storage (NAS), and so forth. In some embodiments the user specifies the backup destination by selecting the backup destination from a drop-down menu or other list. Alternately, the user can enter the backup destination in a text box.

In some embodiments the backup application is configured to automatically direct the data files to be backed up to a pre-determined location, so that the user does not need to specify a destination. One example of a pre-determined location is a website accessible over the Internet. In such a case the data is automatically uploaded to the website. An online service provider, for example, can offer data storage as a service and distribute CD-ROMs including the backup application, where the backup application is configured to automatically direct data files to a URL maintained by the online service provider. The data files can then be stored, for instance, on servers maintained by the online service provider.

Payment for the storage service can be arranged in numerous different ways. As one example, the backup application asks the user to provide an e-mail address after the data files have been copied to the online service provider's servers. The online service provider can then send an e-mail to the user with pricing information based on the amount of storage used, for example, and requesting a credit card number for billing purposes. Rather than charge for the storage itself, the storage can be free but subsequent access or use can be billed. Examples of uses that can be billed for include printing copies of the data files, and where the data files are images, using the images in merchandising such as printing on T-shirts, coffee mugs, buttons, and so forth. In other embodiments, the backup application installs an access application on the data source 600. Launching the access application opens a browser such as Internet Explorer and directs the browser to the website of the online service provider. The online service provider can then charge the user for access to the data files.

Another example where the backup application can be configured to automatically direct the data files to be backed up to a pre-determined location is within the context of an organization, such as a corporation. For instance, an information technology (IT) department of a corporation can provide a backup application CD-ROM to each employee having a computer. The backup application can be configured to selectively back up business-related files such as e-mails and business application data. The data files are then directed to a specific drive on the corporation network that has been dedicated for this purpose. Advantageously, employees working remotely from the office can readily back up files.

Regardless of the destination for the data files, whether selected by the user or pre-determined, backing up 810 the data files proceeds as otherwise described with respect to FIG. 7 starting with looking 725 for installed data burning software. After completion, the backup application can display 760 a message indicating successful completion.

Figure 9:
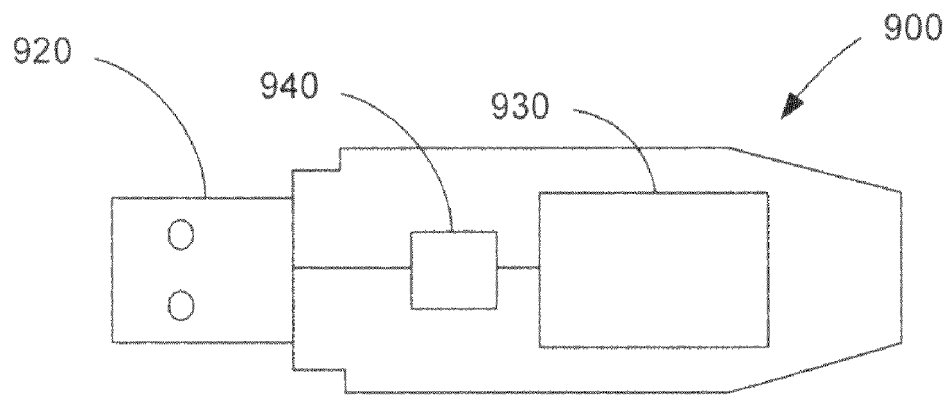
FIG. 9 is a schematic representation of a data backup system according to still another exemplary embodiment of the present invention.
Figure 10:
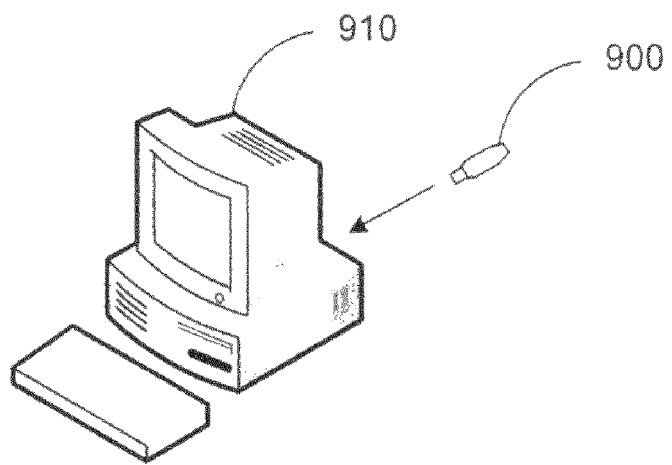
FIG. 10 is a schematic representation of a data source and the data backup system of FIG. 9.

FIGS. 9 and 10 provide schematic representations of another exemplary embodiment of a data backup system 900 that can be connected to a data source 910. The data backup system 900 can comprise a USB interface 920 to allow the data backup system 900 to connect to a USB interface (not shown) of the data source 910. The data backup system 900 can be, for example, a USB flash drive (UFD) such as a key drive, pen drive, jump drive, thumb drive, a memory stick, or the like.

The data backup system 900 can also comprise a flash memory 930 and an emulation component 940 in communication between the flash memory 930 and the USB interface 920. The flash memory 930 includes computer-readable instructions comprising, for example, a backup application. The backup application, when executed, is configured to selectively copy data files from the data source 910 to a networked storage.

Examples of networked storage include a server of a commercial service provider, Network Attached Storage (NAS), and networked drives such as a drive of a Local Area Network (LAN). In some embodiments, the backup application comprises an address of the networked storage. In these embodiments, executing the backup application causes the backup application to automatically direct the data files to the address. For example, where the backup application comprises an address of a commercial service provider, executing the backup application causes the backup application to automatically direct the data files to the commercial service provider.

Since the data backup system 900 does not comprise an auto-launch device, the data backup system 900 includes the emulation component 940. The emulation component 940 includes logic configured to represent the flash memory 920 as an auto-launch device. Accordingly, when the data backup system 900 is connected to the data source 910, the data source 910 is able to automatically launch the backup application, as described in detail above.

Figure 11:
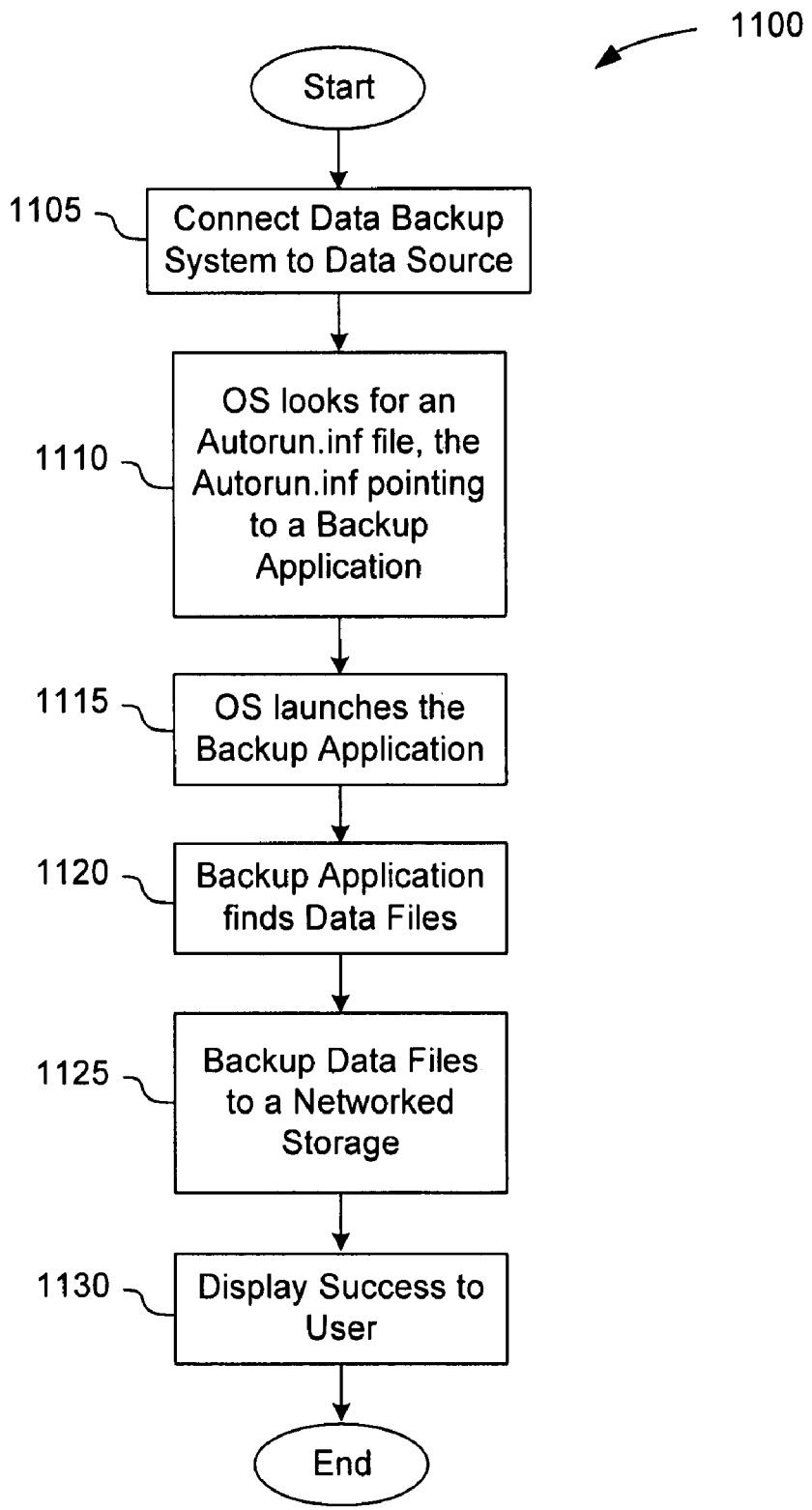
FIG. 11 is a flow-chart representation of another method for backing up data files on a data source according to another exemplary embodiment of the present invention.

FIG. 11 is a flow-chart representation of another exemplary method 1100 for backing up data files from a data source. The method 1100 provides for emulating an auto-launch device in order to automatically run a backup application configured to copy data files to a networked storage. The method 1100 begins with connecting 1105 a data source to a data backup system that includes both an emulation component and a backup application. Connecting 1105 the data source to the data backup system can comprise, in some embodiments, a USB flash drive returning a response through a USB interface of the USB flash drive. Here, the response is to an inquiry from the data source, and the response identifies a flash memory of the USB flash drive as being an auto-launch device. The emulation component can represent the flash memory to be a CD drive that includes a CD medium, or a DVD drive that includes a DVD medium, for example.

In one embodiment, the Windows operating system detects the connection event of connecting 1105. As provided above with respect to FIG. 4, the Windows operating system sends an inquiry for a device descriptor when new hardware is detected. Since the data backup system includes the emulation component, the Windows operating system receives from the emulation component a response comprising a device descriptor that is suitable to trigger the AutoRun functionality of the Windows operating system. Accordingly, the Windows operating system automatically looks 1110 for an Autorun.inf file on the data backup system, and more specifically, within the root directory of the computer-readable instructions. In this example, the Autorun.inf file points to the backup application. Accordingly, the Windows operating system automatically launches 1115 the backup application to run on the data source.

Launching 1115 the backup application can comprise providing the backup application to the data source. As discussed above, another function of the emulation component is to translate between command and response formats. This can comprise receiving auto-launch device commands from the data source, translating the auto-launch device commands to flash memory commands, and sending the flash memory commands to the flash memory. Providing the data backup application can also comprise receiving flash memory responses from the flash memory, translating the flash memory responses into auto-launch device responses, and sending the auto-launch device responses to the data source.

The backup application then finds 1120 data files at the data source to be backed up according to a criterion such as type of content, as described above. Next, the backup application backs up 1125 the found data files to a networked storage. Once the data files have been successfully backed-up, the backup application can display 1130 a message of successful completion.

Returning to backing up 1125 the data files, in some embodiments the backup application is configured to automatically direct the data files to a pre-determined address, so that the user does not need to specify the networked storage. One example of a pre-determined address is a URL of a server accessible over the Internet. In such a case backing up 1125 the data files includes automatically uploading the data files to the server. A pre-determined address can also be used to automatically direct data files to other networked storage such as a network drive, Network Attached Storage (NAS), and so forth.

One exemplary method that relies on the backup application having a pre-determined address for the networked storage consists of a user connecting a USB flash drive, including an emulation component, to a USB interface of a data source. In this example, an operating system of the data source automatically launches the backup application stored on the USB flash drive, and then the backup application automatically copies data files from the data source to the networked storage. Thus, the user can backup data files from the data source to the networked storage merely by connecting the USB flash drive to the data source. It will be appreciated that the operating system of the data source is able to automatically launch the backup application because of the presence of the emulation component, as provided above.

Returning again to backing up 1125 the data files, in some embodiments the backup application allows a user to specify a networked storage destination. In some of these embodiments, the user specifies the backup destination by selecting the networked storage from a drop-down menu or other list. Alternately, the user can enter an address of the networked storage in a text box.

Figure 12:
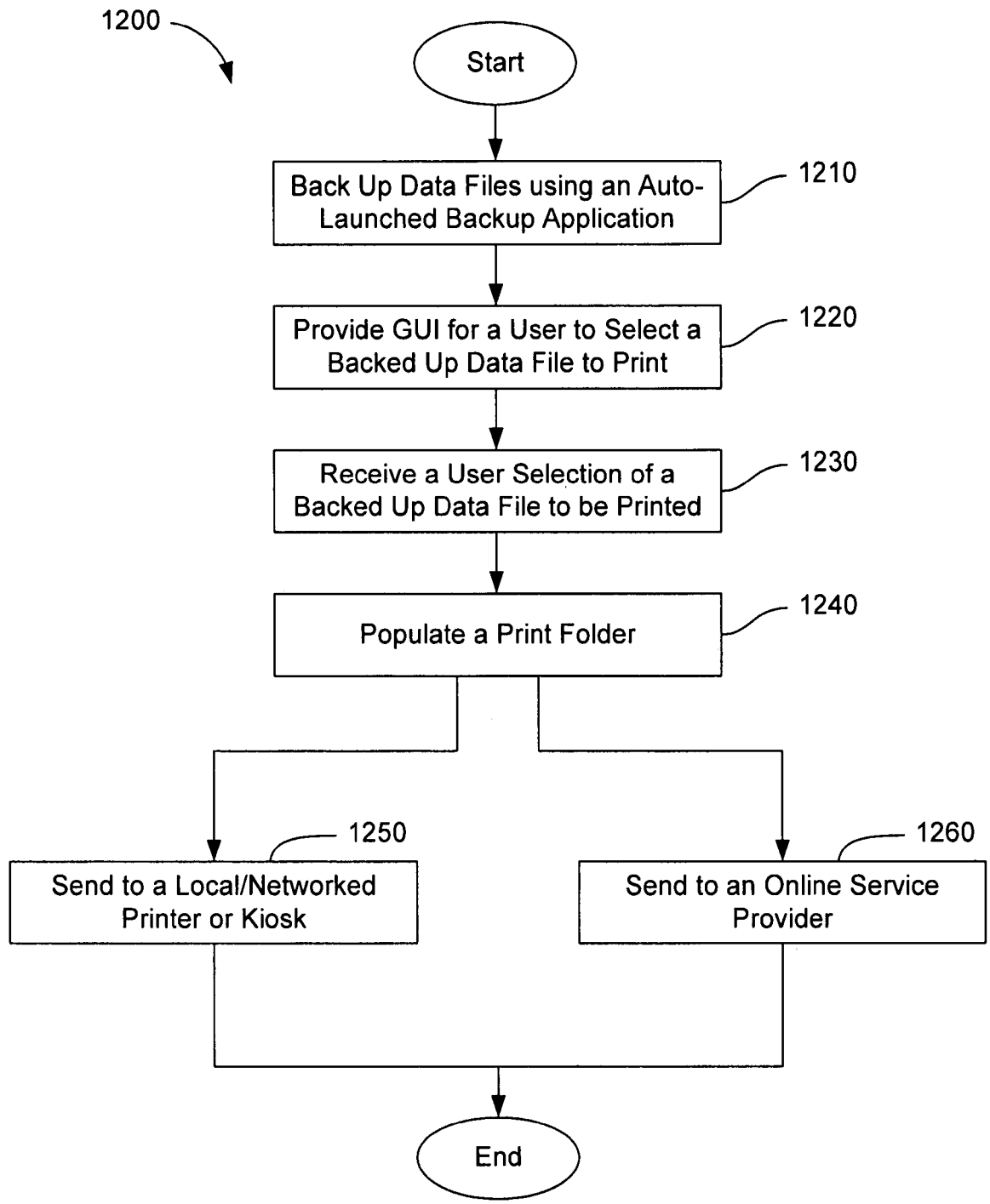
FIG. 12 is a flow-chart representation of a method for backing up data files and printing some of those data files according to an exemplary embodiment of the present invention.

As noted above, the backup application can include functionalities beyond the data file backup capabilities described elsewhere herein. FIG. 12 is a flow-chart representation of a method 1200 that an exemplary backup application can perform and that provides printing functionalities in addition to backup capabilities. The method 1200 comprises backing up data files from a data source using an auto-launched backup application, and providing a GUI that allows a user to select, from amongst the backed up data files, a data file for printing. The method 1200 further comprises receiving a user selection of a data file to be printed from amongst the backed up data files and populating a print folder. The print folder can be populated with a copy of the selected data file, a pointer to the selected data file, or a file name of the selected data file, for example. The method 1200 can optionally comprise sending the selected data file, or a copy thereof, to be printed. Sending the selected data file, or a copy thereof, to be printed can comprise sending the selected data file from the print folder, or using the pointer or file name to locate and send the selected data file from the location where the selected data file has been backed up.

Referring to FIG. 12, the method 1200 comprises backing up 1210 data files from the data source by using an auto-launched backup application. This can comprise, for example, an initial backup of data files from a data source as described by the method 300 of FIG. 3. In the initial data backup, a backup system is connected for the first time to the data source and consequently a backup application is automatically launched to run on the data source. Once the backup application has run on the data source and selectively backed up data files therefrom, backing up 1210 data files can comprise any subsequent backup. Subsequent backups can be initiated as desired by a user, or initiated automatically by the backup application in response to some backup trigger such as the expiration of a period of time.

Backing up 1210 data files can comprise selectively copying the data files from the data source according to a criterion. The backed up data files can be copied to a backup system connected to the data source, such as backup system 100 (FIG. 1), backup system 200 (FIG. 2), or optical disc 500 (FIG. 5). Alternatively, the backed up data files can be copied to a networked storage, as described, for example, with respect to FIG. 11.

Providing 1220 the GUI can comprise displaying the GUI on a display device of the data source or a display device of the backup system. Where the GUI is displayed on the data source, the backup application can be configured to read the backed up data files from either or both of a connected backup system or from a networked storage to allow the user to make a selection. Where the GUI is displayed on the backup system, logic of the backup system can simply display a list of file names on the GUI. Logic of the backup system can also employ the resident copy of the backup application, in some embodiments, to read and display on the GUI data files that have been copied to the backup system. Backup systems that include such logic and a display device for the GUI provide the user with the ability to review backed up data files when the backup system is not connected to the data source. Thus, for example, the user can back up photos from a PC, disconnect the backup system from the PC, and then use the GUI on the backup system to select one or more photos to print.

In some situations, providing 1220 the GUI occurs automatically when data files are backed up 1210 without user involvement. Automatically providing 1220 the GUI can be a default setting, in some embodiments. In other situations, the user can request that the backup application provide 1220 the GUI. In some of these embodiments, the user can change the default setting so that providing 1220 the GUI does not automatically occur. In some embodiments, whether providing 1220 the GUI occurs automatically depends on the type of data file that has been backed up. For example, providing 1220 the GUI can occur automatically for backed up photos but not for backed up music or text documents.

Providing 1220 the GUI allows the user to select one or more data files to print from amongst the backed up data files. Providing 1220 the GUI can comprise showing the backed up data files in any number of well known formats. For example, the backed up data files can be shown as one or more pages of reduced resolution ("thumbnail") images or as a file list. The backed up data files can be arranged in the display by date, file name, or some other attribute. The GUI can also allow the user to review backed up data files at a higher resolution, in some embodiments. As the user selects data files to print, those data files can be shown within the GUI as selected for printing, for example, by highlighting the data file or any other well known technique.

Receiving 1230 the user selection of the data file to be printed can comprise the backup application receiving some input that identifies the data file. As one example, the GUI can display a number with each displayed data file and the user can indicate the user selection by typing the number of the data file on a keyboard. As another example, the user can use a pointing device such as a mouse, or a touch screen, to select the data file. The backup application then receives an input from the pointing device or touch screen that can be mapped to the selected data file.

In some embodiments, the GUI further allows the user to select one or more printing options for the data files selected for printing. In this way the printing of selected data files can be customized with respect to parameters such as the number of copies and the printing device. Thus, receiving 1230 the user selection can also include the backup application receiving from the GUI a printing option pertaining to the selected data file. In particular, where the data files are photos, printing options pertaining to the selected data file can comprise photo editing (e.g., adjustments to color and brightness, cropping, etc.) and parameters such as print size, type of paper, and finishing. In some embodiments, the backup application includes default settings for the various parameters, and the GUI can allow the default settings to be overridden, changed or restored.

After receiving 1230 the user selection of the data file to be printed, the backup application populates 1240 the print folder. Populating 1240 the print folder can comprise, for example, storing a copy of the selected data file in the print folder. Populating 1240 the print folder can also comprise storing in the print folder a pointer to the selected data file or a file name of the selected data file. In various embodiments, the print folder is a folder that resides on the backup system, or networked storage, as part of a file structure that also includes the backed up data files. Having the print folder on the backup system with the backed up data files allows the backup system to be connected to and utilize different printing options, as discussed below. Alternatively, where the backup system is not configured to store the backed up data files, as in data backup system 900 (FIG. 9), the print folder can reside on the data source or networked storage. Multiple print folders can also be maintained, in some situations. For example, separate print folders can be populated to direct selected data files to different printing alternatives, as discussed below.

In some instances, where populating 1240 the print folder comprises storing the copy of the selected data file, and receiving 1230 the user selection also includes receiving a printing option pertaining to the selected data file, populating 1240 the print folder can include storing the selected data file as modified by the printing option. For example, where the printing option pertains to cropping, the cropped data file can be stored in the print folder. In other instances, populating 1240 the print folder further comprises associated the printing option with the selected data file in the print folder. For example, printing options comprising instructions to print two copies of a selected data file on 5×7 paper with a glossy finish can be stored in the print folder, either in association with the copy of the selected data file, or in association with the pointer or file name.

As noted above, once the print folder has been populated 1240, the method 1200 can optionally comprise sending the data file, or a copy thereof, to be printed. This can be performed by the backup application, or by another application such as a printing application. Sending the copy of the selected data file to be printed can include sending the copy of the selected data file from the print folder, whereas sending the selected data file to be printed can include using the pointer or file name to locate and send the selected data file.

Sending the data file, or a copy thereof, to be printed can include sending 1250 to a local or networked printer or kiosk, or sending 1260 to an online service provider, for example. In some instances, sending 1250, 1260 is performed automatically after the user has finished selecting data files, or sending 1250, 1260 can occur at some later time. Sending 1250, 1260 can further include marking the selected data file to indicate that the data file has been printed. Additionally, sending 1250, 1260 can include displaying a notice to the user, through the GUI for example, regarding printing success or problems such as an inability to connect to the online service provider's website or that one or more selected data files cannot be printed.

Examples of exemplary printing alternatives are discussed with respect to FIGS. 13-16. Turning first to printing from a local or networked printer, as in FIG. 13, the selected data file, or a copy of the selected data file, can be sent 1250 to a printer 1300 connected to a data source 1310 across a connection 1320. Here, the connection 1320 can be a direct connection, where the printer 1300 is a local printer, or the connection 1320 can be a network connection such as a LAN where the printer 1300 is a networked printer.

Figure 13:
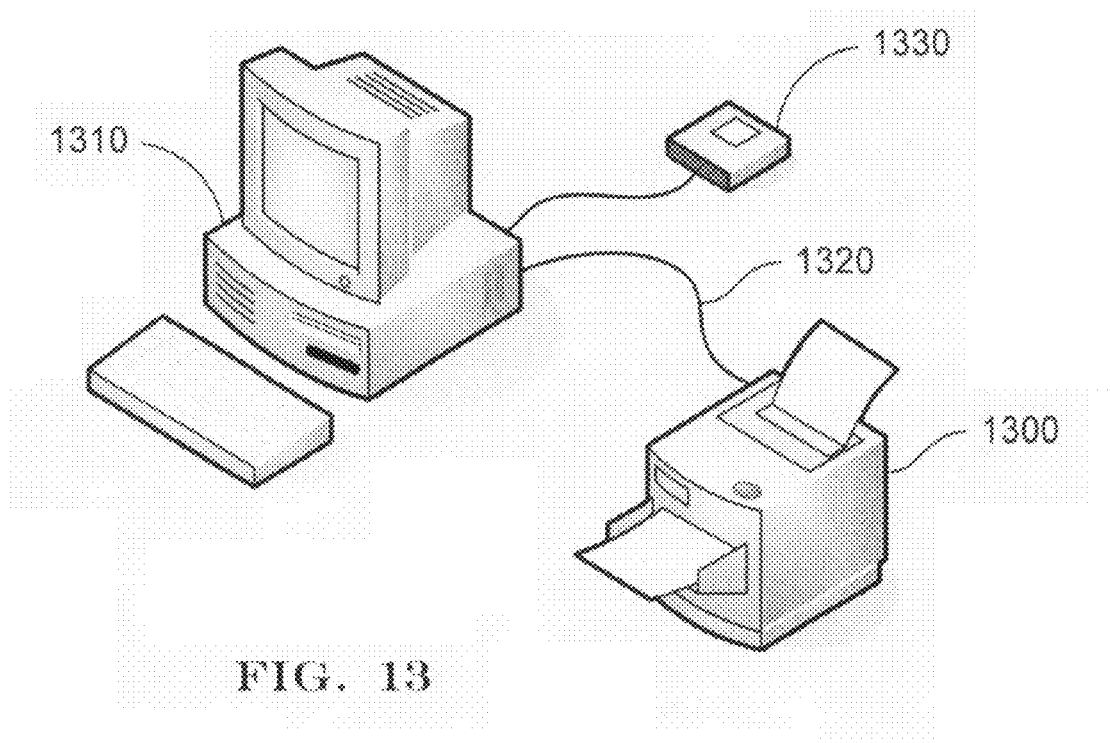
FIG. 13 is a schematic representation of a data source connected to a backup system and a printer for printing backed up data files according to an exemplary embodiment of the present invention.

FIG. 13 also shows a backup system 1330 attached to the data source 1310. The print folder can reside on the data source 1310 or the backup system 1330. As noted, the print folder can store either a copy of the selected data file, a pointer to the selected data file, or a file name of the selected data file. Thus, the copy of the selected data file can be sent 1250 from the print folder to the printer 1300, or the pointer or file name can be used to locate the selected data file and then send 1250 the selected data file to the printer 1300. It should be noted that where the print folder resides on the data source 1310, instead of the backup system 1330, the selected data file, or the copy of the selected data file, can be sent 1250 even if the backup system 1330 has been disconnected from the data source 1310.

In the embodiments illustrated by FIG. 13, sending 1250 can be triggered either manually by the user or automatically by the backup application. Where sending 1250 occurs automatically, the backup application can send 1250 when the user finishes selecting data files, for instance. Alternatively, the backup application can send 1250 in response to a printing trigger. Examples of printing triggers include the expiration of a threshold period of time (e.g., once a week), a determination that the cumulative size of the selected data files has reached some threshold (e.g., 25 MB), a determination that the number of selected data files has reached some threshold, or the detection of a connection of the printer 1300 to the data source 1310.

Figure 14:
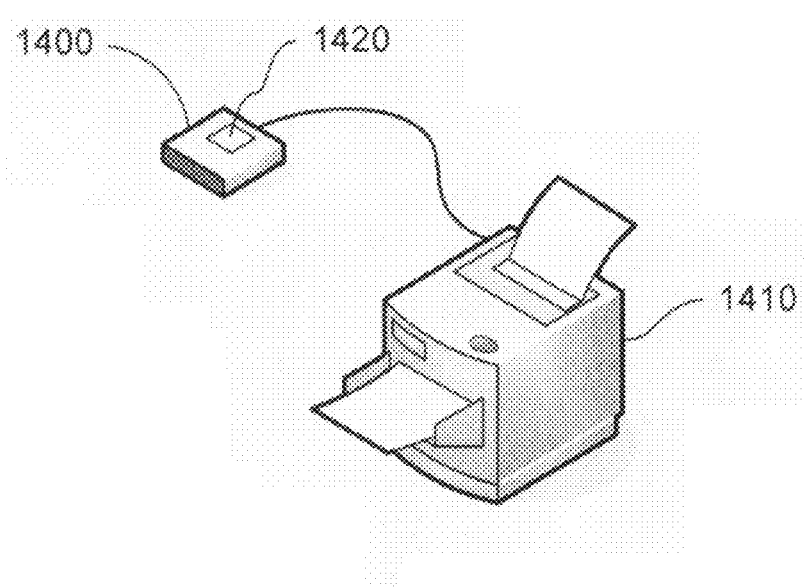
FIG. 14 is a schematic representation of a backup system connected to a printer for printing backed up data files according to an exemplary embodiment of the present invention.

Referring now to FIG. 14, a backup system 1400 can be directly connected to a printer 1410, which again can be a local printer or a networked printer. In this instance, the print folder resides on the backup system 1400 so that the backup system 1400 can print without being connected to a data source. As above, the backup application or another application can send 1250 the copy of the selected data file from the print folder to the printer 1410, or the pointer or file name can be used to locate the selected data file and send 1250 the selected data file to the printer 1410.

It will be noted that some embodiments of the backup system 1400 include a display 1420. The display 1420 can allow the backup application to provide 1220 the GUI on the backup system 1400 so the user can select backed up data files and print when the backup system 1400 is not connected to a data source.

In some embodiments, sending 1250 to the printer 1410 occurs automatically in response to detecting the connection of the printer 1410 to the backup system 1400. This feature is achieved, in some embodiments, through the use of a standard direct printing technology such as PictBridge or USB On-The-Go (USB OTG). Sending 1250 to the printer 1410 can also be triggered manually by the user.

Figure 15:
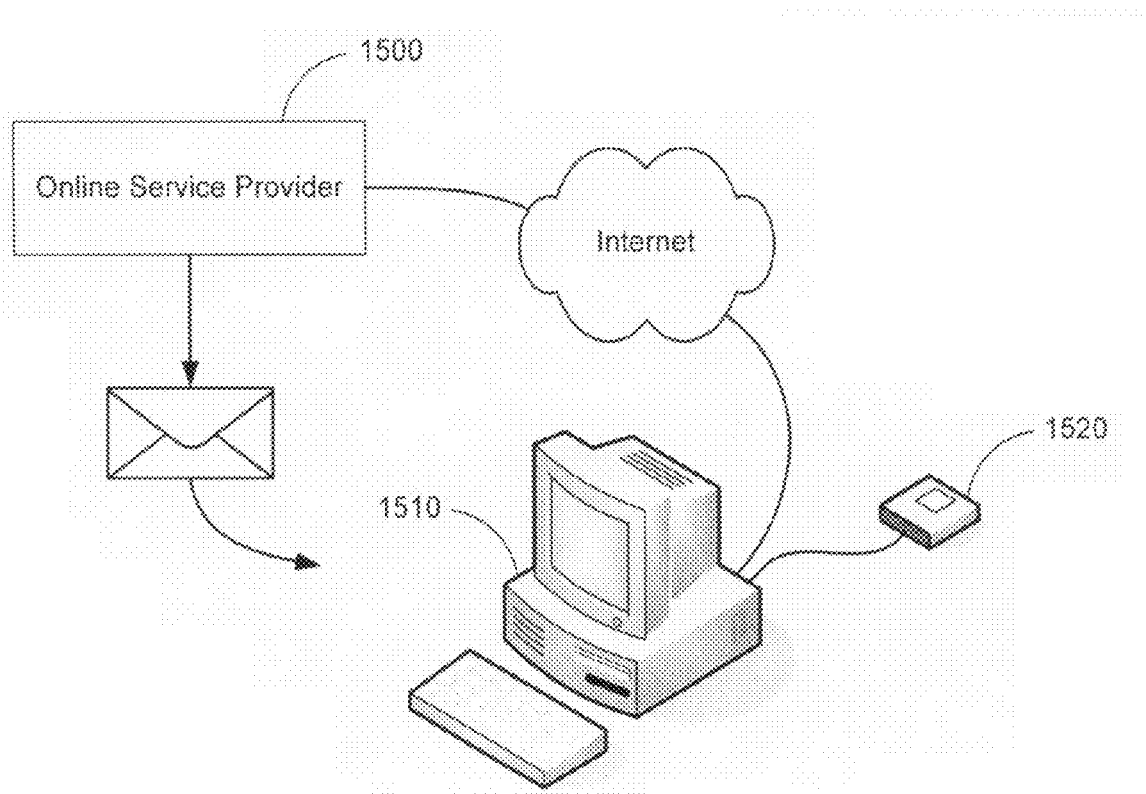
FIG. 15 is a schematic representation of a data source connected to a backup system and an online service provider for printing backed up data files according to an exemplary embodiment of the present invention.

As shown in FIG. 15, sending 1260 can include sending the selected data file, or a copy thereof, to an online service provider 1500 such as an online photo printing service. The online service provider 1500 prints the data files and then either mails the printed copies to the user, or to another destination specified by the user, or makes the prints available to be picked up by the user at some convenient location. Here, a print folder can reside on a data source 1510, on a backup system 1520, or by the online service provider 1500. Where the print folder resides on the data source 1510 or on the backup system 1520, the copy of the selected data file can be sent 1260 from the print folder to the online service provider 1500. Alternatively the pointer or file name can be used to locate the selected data file amongst the backed up data files to send 1260 to the online service provider 1500. As noted with respect to FIG. 13, sending 1260 can be triggered manually by the user, or automatically once the user is finished selecting data files or in response to a print trigger.

In some embodiments the backup application is initially configured to interface with one or more particular online service providers 1500 and in some of these embodiments providing 1220 the GUI includes providing the user with the option to select one of these particular online service providers 1500. If such an online service provider 1500 is selected, the backup application can request that the user provide specific information for interfacing with the online service provider 1500 such as user name, password, mailing address, and so forth. The backup application can save this information for later use in order to send 1260.

The backup application can also allow the user to designate some other online service provider 1500 other than the particular online service providers 1500 for which the backup application was initially configured. In these embodiments, the user connects to the online service provider 1500 of the user's choice and the backup application records information for later use such as the URL of the online service provider 1500 and the user name and password. In this way, reconnection to the online service provider 1500 can be made automatic.

Figure 16:
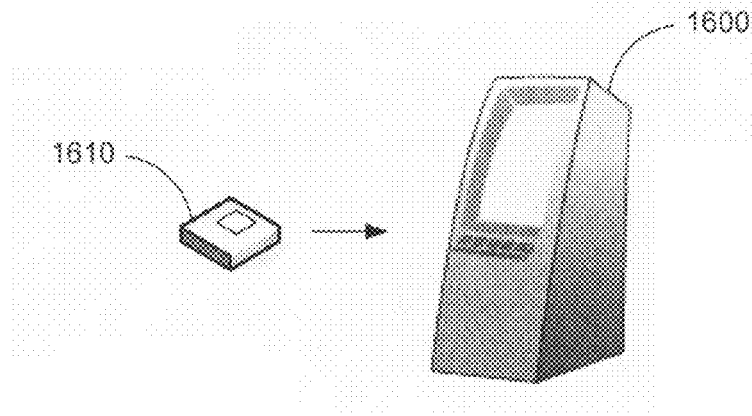
FIG. 16 is a schematic representation of a backup system connected to a kiosk for printing backed up data files according to an exemplary embodiment of the present invention.

Referring now to FIG. 16, the user can also print from a kiosk 1600 such as a photo printing kiosk located in a mall or in a grocery store, for example. Here, printing from the kiosk 1600 includes disconnecting a backup system 1610 from a data source and connecting the backup system 1610 to the kiosk 1600. In some embodiments, upon connection of the backup system 1610 to the kiosk 1600, the kiosk 1600 will automatically read the contents of a print folder residing on the backup system 1610. Where the print folder stores a copy of the selected data file, the copy is sent 1250 to the kiosk 1600. Where the print folder stores a pointer to the selected data file, or a file name of the selected data file, the pointer or file name can be used to locate the selected data file to send 1250 to the kiosk 1600.

In other embodiments, the backup system can include a removable storage device interface 230 (FIG. 2) so that the print folder can be stored on a removable storage device 240 (FIG. 2). Here, only the removable storage device 240 needs to be taken to the kiosk 1600, rather than the entire backup system 1610.

In some embodiments, credits or a monetary value can be included with the backup application on the backup system 1520, 1610 for use with a particular online service provider 1500 or kiosk 1600 to encourage an initial use thereof. The credit or monetary value can be increased, in some instances, as a further incentive to use a particular type of payment method (e.g., a brand of credit card, PayPal, e-mail money, etc.).

In FIGS. 13-16 a single icon has been used to represent the backup system, but it will be understood that various backup systems described herein can be used with the various printing embodiments. For example, in FIG. 13 the backup system 1330 can be a backup system 100 (FIG. 1), 200 (FIG. 2), an optical disc 500, or a backup system 900. As another example, the backup system 1610 in FIG. 16 can be any backup system that data files can be backed up to, such as backup system 100 (FIG. 1), 200 (FIG. 2), and optical disc 500.

Figure 17:
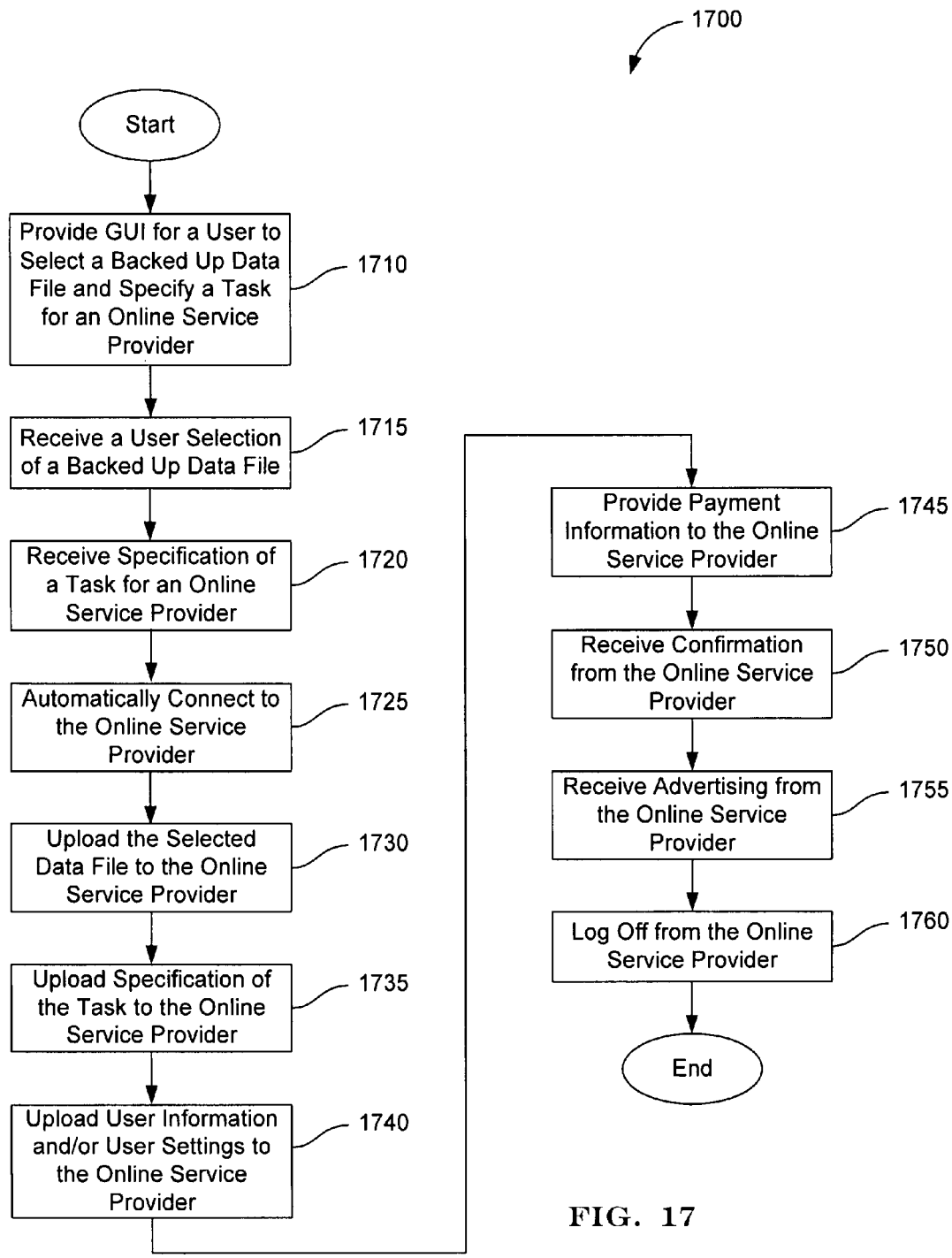
FIG. 17 is a flow-chart representation of a method for backing up data files and automatically connecting to an online service provider to upload selected backed up data files according to an exemplary embodiment of the present invention.

FIG. 17 provides a flow-chart representation of another exemplary method 1700 of the invention. According to the method 1700, an application running on a data source can automatically connect to an online service provider (e.g., online service provider 1500 (FIG. 15)), upload selected backed up data files thereto, and cause the online service provider to execute certain tasks involving the uploaded data files. The application can comprise computer readable instructions stored on a computer readable medium and can be a standalone application, or can be integrated with some other application such as the backup application described herein.

The method 1700 begins by providing 1710 a GUI for a user to select a backed up data file and specify a task for an online service provider. The application then receives 1715 a user selection of a data file, receives 1720 a specification of a task for an online service provider, and automatically connects 1725 to the online service provider. Once connected, the application uploads 1730 the selected data file to the online service provider and uploads 1735 the specification of the task to the online service provider. At this point the online service provider can execute the task. Optionally, the application can upload 1740 user information and/or a user setting to the online service provider, provide 1745 payment information to the online service provider, receive 1750 confirmation from the online service provider that the task has been completed, receive 1755 advertising from the online service provider, and log off 1760 from the online service provider.

As just noted, the method 1700 includes providing 1710 a GUI for a user to select a backed up data file and specify a task for an online service provider. GUIs for selecting backed up data files have been discussed above, for example, in connection with FIG. 12. The GUI is also configured to allow the user to specify a task for an online service provider. Examples of tasks, and exemplary configurations for the GUI to allow tasks to be specified are described below. In some embodiments, the GUI is provided 1710 automatically after data files have been backed up, as also described above with respect to FIG. 12.

Tasks that can be specified through the GUI include actions to be carried out by the online service provider on the backed up data files that are selected through the GUI. Such actions can include printing, sharing, viewing, archiving, and playing the selected backed up data files. In some embodiments, multiple tasks can be specified through the GUI for the same backed up data file, such as printing and sharing. For some tasks, the user can also specify task preferences that further delineate how the online service provider is to execute the task. Tasks can also be specified to occur at or after some specified future time. A task, together with any task preferences, comprises the specification of the task. In addition to specifying tasks and task preferences, the GUI can also be used to affect the online service provider in other ways, as noted below. A few examples of tasks that can be specified through the GUI will now be provided.

Photo printing of selected backed up data files is one example of a task for an online service provider. The task can be further delineated by specifying printing preferences such as print size, choice of paper, and number of copies. These printing preferences can be applied to all of the selected backed up data files, or can be specified for selected backed up data files individually. A task similar to photo printing is document printing. As with photo printing, printing preferences can be further specified and applied to selected document data files globally or individually.

Another example of a task for an online service provider is sharing selected backed up data files. The task of sharing can be further delineated by specifying sharing preferences such as which individuals have permission to access the selected backed up data files, how long data files will be available for sharing, and so forth. Similar tasks for an online service provider are viewing and playing selected backed up data files. Music and video data files, for example, can be played by an online service provider. It will be appreciated, of course, that playing may simply be the server of the online service provider serving the data files to the computer of whomever wishes to play the data file so that it can be played on that computer. The task of playing can be further delineated by specifying playing preferences such as whether the data files are streamed or made available to download.

Still another example of a task for an online service provider is archiving selected backed up data files. While a backup system (e.g. backup system 100 (FIG. 1)) can provide a high degree of security over accidental loss of important data files, archiving yet another copy to a remote location provides even further security against catastrophic loss. Again, the archiving task can be further delineated by specifying archiving preferences.

As noted above, the GUI can also be used to cause the application to affect the online service provider in other ways. For example, the user can provide new or updated user information and user settings for use by the online service provider. User information can include, for instance, account information such as the user's billing information and shipping address, and user credentials such as the user name and password.

User settings include the user's default options, or preferences, that are associated with the user's account by the online service provider. As an example, an online service provider offering photo sharing services may charge a monthly fee based on the amount of storage consumed by a customer's uploaded data files. Thus, a user preference can be the duration of time that uploaded data files are maintained before being deleted by the online service provider. The default duration can be, for instance, one month. Through the GUI, the user can specify a change in that duration. In the context of photo printing, an example of a user setting is the default brand or type of photo paper.

The method 1700 also comprises receiving 1715 a user selection of a data file and receiving 1720 a specification of a task for an online service provider. The GUI can be designed to allow selecting backed up data files and specifying tasks in a variety of different ways. For instance, backed up data files can be dragged to folders or icons representing various tasks. Alternatively, a radio button for a task can be clicked, and then backed up data files can be selected for that task. Tabbed pages can be used to navigate between tasks. Depending on the design of the GUI, receiving 1715 a user selection of a data file and receiving 1720 the specification of the task for an online service provider can therefore occur in either order. In some instances, selecting a backed up data file of a particular file type will implicate a particular task without the user having to expressly specify the task. For instance, selecting a backed up data file having a music file type such as .mp3 can be sufficient to specify that the task is playing.

Figure 18:
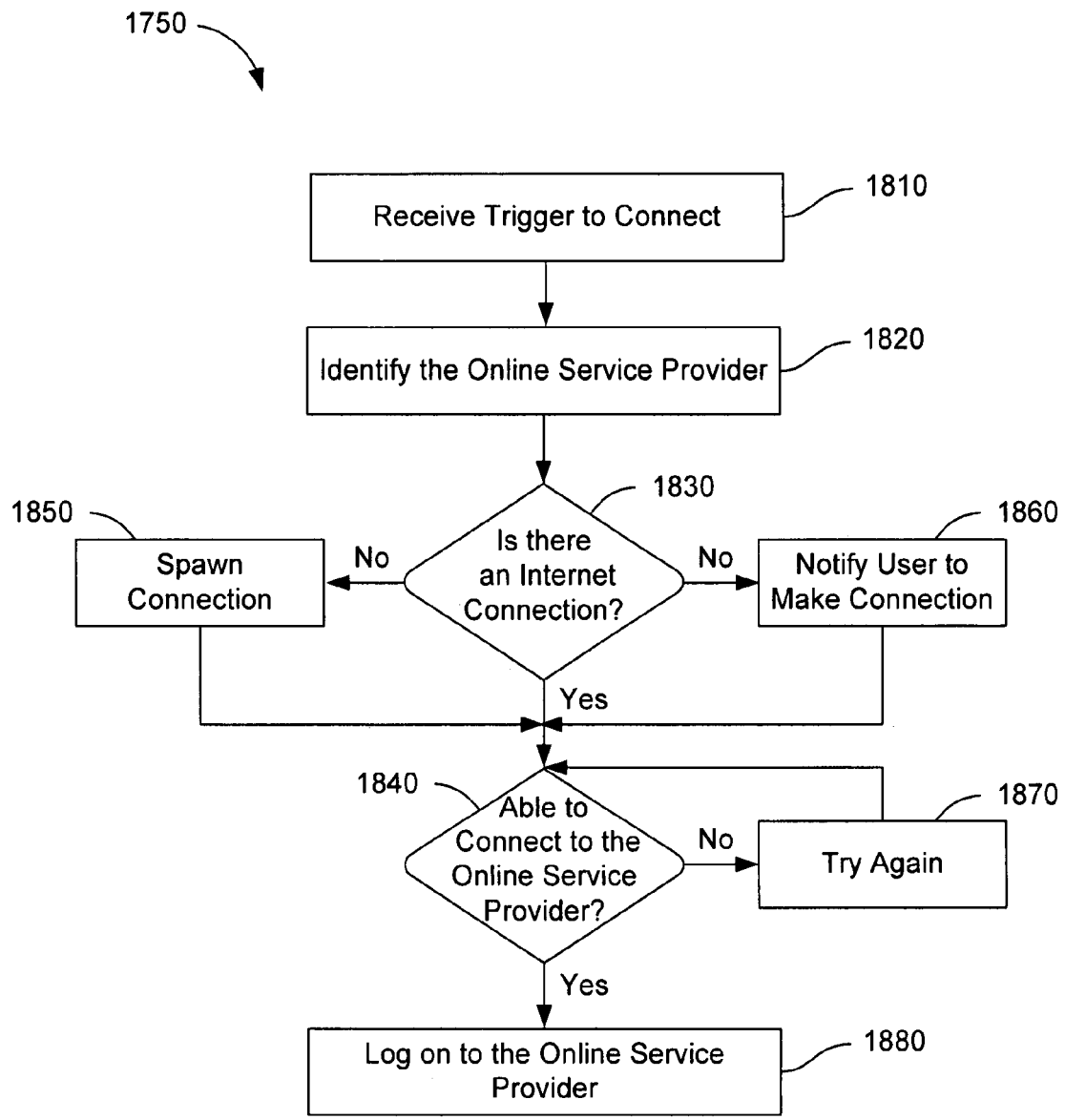
FIG. 18 is a flow-chart representation of a method for automatically connecting to an online service provider according to an exemplary embodiment of the present invention.

The method 1700 further comprises automatically connecting 1725 to the online service provider. FIG. 18 provides a flow-chart representation of an exemplary method for automatically connecting 1725 to the online service provider. Here, automatically connecting 1725 begins by receiving 1810 a trigger to connect. Events that can trigger printing to an online service provider have been discussed with respect to FIG. 12 and apply equally to other tasks as well. In some embodiments, where more than one task specification has been received 1720, automatically connecting 1725 to the online service provider can include connecting 1725 to more than one online service provider in parallel.

Automatically connecting 1725 also includes identifying 1820 the online service provider. In some instances, the online service provider for a given task is expressly selected by the user through the GUI as the task is specified. For example, the user can provide a URL. As another example, the user can select the online service provider from a predefined list of online service providers that are associated with the task. Where the user selects the online service provider, identifying 1820 the online service provider can include obtaining the online service provider from the specification of the task.

In other instances, the online service provider for a given task is identified 1820 by a default setting. For example, the application can include a predefined default provider for a given task. Additionally, where the application has previously uploaded a user selected backed up data file to a user selected online service provider for a particular type of task, that online service provider can become the default provider for that type of task. Thereafter, the application will automatically direct the same type of task to that default provider. When the user specifies a task of that type through the GUI, the user can be informed of the default provider and given an opportunity to decline the default provider and select another. In light of the above, it will be understood that identifying 1820 the online service provider, in some instances, will precede receiving 1810 the trigger to connect.

In still other instances, the application identifies 1820 the online service provider for the task by following a rule or a set of rules. Thus, for example, a rule can specify one online service provider for a task of printing, where a printing preference is for paper larger than 8×10, while a different online service provider is specified for printing where the printing preference is for paper that is 8×10 or smaller. Such rules can themselves be provided as defaults that can be modified through the GUI, in some embodiments.

Automatically connecting 1725 also includes determining 1830 whether an Internet connection exists. In some embodiments, if the application cannot find an Internet connection, the application is configured to spawn 1850 the Internet connection. If the application cannot spawn 1850 the Internet connection, the application can wait a period of time and try again. The application can be configured to repeat this procedure a number of times, and if the Internet connection still cannot be established, the application can notify the user that a connection to the Internet cannot be established and the method 1700 ends. In other embodiments, if the application cannot find an Internet connection, the application notifies 1860 the user and waits for the user to establish the Internet connection. Methods for providing notifications have been described above with respect to FIG. 12.

Once the application determines 1830 that an Internet connection exists, the application determines 1840 whether it is able to connect to the online service provider. If the application cannot connect to the online service provider, the application can be configured to wait a predetermined period of time and then try again 1870 to connect to the online service provider. If, after a preset number of cycles, the application still cannot connect to the online service provider, the application can notify the user that a connection to the online service provider cannot be established and the method 1700 ends.

Once the application connects to the online service provider, the application logs on 1880 to the online service provider. Logging on 1880 to the online service provider can be achieved by supplying user credentials to the online service provider, such as a user name and password. In some embodiments, the user credentials are encrypted for added security. The user credentials can be read, for example, from a hidden directory.

In further embodiments, the application includes default user credentials for the online service provider. With the default user credentials, the application can log on 1880 to the online service provider without having to register the user. Default user credentials can be included with an application as originally installed on a device such as a backup system (e.g., backup system 100 (FIG. 1)), or can be added to the application through a software update, for example.

Referring again to FIG. 17, after the application has automatically connected 1725 to the online service provider, the method 1700 continues by uploading 1730 the selected backed up data file to the online service provider. Uploading 1730 the selected backed up data file can be performed automatically, in some embodiments. In order to do so, the application can be configured to interface with the particular online service provider, either by being preconfigured or by recording previous activity with the online service provider.

The method 1700 also comprises uploading 1735 the specification of the task to the online service provider. Uploading 1735 the specification of the task includes uploading the specified task and any specified task preferences. To print the selected backed up data file, for instance, the task specified can be printing and the preferences specified can include the number of prints, the size of the prints, and the finish, etc. The method 1700 also can optionally comprise uploading 1740 user information and/or user settings to the online service provider in order to update billing information and to change the length of time that data files are retained by the online service provider, for example.

The method 1700 optionally can include providing 1745 payment information to the online service provider. In some instances, the online service provider can request a credit card number from the user to pay for the task. The user then provides the credit card number through the GUI. Providing 1745 payment information in this instance includes the application transmitting the credit card number to the online service provider. In the alternative to providing 1745 payment information, a registered user of the online service provider can have a prearranged payment method, such as billing to an existing credit card or account.

The application can also apply bundled credits to pay for the task, in whole or in part to provide 1745 payment information. As discussed with respect to FIG. 12, bundled credits can be provided with an application as originally installed on a device such as a backup system (e.g., backup system 100 (FIG. 1)) and can be added through promotions or by purchasing more credits. The application can display the credit balance to the user through the GUI, in some embodiments, as part of providing 1745 payment information.

Once payment information has been provided 1745, the online service provider may execute the task according to the specification of the task. The method 1700 can also optionally include receiving 1750 a confirmation from the online service provider that the task has been successfully completed. In some embodiments, the application then notifies the user that the task has been successfully completed.

The method 1700 can also optionally include receiving 1755 advertising from the online service provider. The advertising can be displayed, for example, in an advertising window of the GUI. Advertisements can include information about special sales, upcoming events, up-selling and so forth. Particular advertisements can be selected at random, can be targeted to the user based on prior history of the user's purchases and actions with the online service provider, or the specification of the task, for example.

The method 1700 can also optionally include logging off 1760 from the online service provider. Logging off 1760 can be in response to receiving 1755 the confirmation. Logging off 1760 can include checking session activity to verify that all task specifications have been uploaded to the online service provider. It will be appreciated that although FIG. 17 shows an exemplary sequence, other sequences are also possible. For example, uploading 1740 user information and/or user settings can occur before, or in parallel with, uploading 1735 the specification of the task. It will also be appreciated that the application can also log events while performing the method 1700 to create an event log of the user selections and communications between the application and the online service provider.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
providing a response to an inquiry from a data source, the response identifying a flash memory of a USB flash drive as being an auto-launch device type, the response being provided through a USB interface of the USB flash drive to the data source;
providing a backup application from the flash memory of the USB flash drive to the data source, the backup application configured to selectively copy data files stored on the data source to a networked storage thereby creating a set of backed up data files, wherein providing the backup application includes
receiving auto-launch device type commands from the data source, translating the auto-launch device type commands to flash memory device type commands, and sending the flash memory device type commands to the flash memory, and
receiving flash memory device type responses from the flash memory, translating the flash memory device type responses into auto-launch device type responses, and sending the auto-launch device type responses to the data source;
providing a GUI for a user to select a data file from amongst the set of backed up data files, and specify a task for an online service provider;
receiving a user selection of a data file from amongst the set of backed up data files;
receiving a task specification for the online service provider;
automatically connecting to the online service provider; and
uploading the selected backed up data file to the automatically connected online service provider.

2. The method of claim 1 further comprising uploading the task specification to the online service provider.

3. The method of claim 2 wherein uploading the task specification includes uploading a task preference.

4. The method of claim 1 wherein providing the GUI occurs automatically after the set of backed up data files has been created.

5. The method of claim 1 wherein receiving the task specification includes receiving a specification to print the selected backed up data file.

6. The method of claim 1 wherein receiving the task specification includes receiving a specification to share the selected backed up data file.

7. The method of claim 1 wherein receiving the task specification includes receiving a specification to play the selected backed up data file.

8. The method of claim 1 wherein receiving the task specification includes receiving a specification to view the selected backed up data file.

9. The method of claim 1 wherein receiving the task specification includes receiving a specification to archive the selected backed up data file.

10. The method of claim 1 wherein receiving the task specification includes receiving a task preference.

11. The method of claim 1 wherein automatically connecting to the online service provider includes receiving a trigger to connect.

12. The method of claim 1 wherein automatically connecting to the online service provider includes identifying the online service provider.

13. The method of claim 12 wherein identifying the online service provider includes obtaining the online service provider from the specification of the task.

14. The method of claim 12 wherein identifying the online service provider includes using a default setting.

15. The method of claim 12 wherein identifying the online service provider includes following a rule.

16. The method of claim 1 wherein automatically connecting to the online service provider includes logging on to the online service provider.

17. The method of claim 16 wherein logging on to the online service provider includes providing default user credentials to the online service provider.

18. The method of claim 1 further comprising uploading user information to the online service provider.

19. The method of claim 1 further comprising uploading a user setting to the online service provider.

20. The method of claim 1 further comprising providing payment information to the online service provider.

21. The method of claim 20 wherein providing payment information to the online service provider includes applying bundled credits.

22. The method of claim 1 further comprising receiving a confirmation of task completion from the online service provider.

23. The method of claim 1 further comprising receiving advertising from the online service provider.

24. A computer readable medium having stored thereupon computing instructions executable by a processor to perform a method, the method comprising:
providing a response to an inquiry from a data source, the response identifying a flash memory of a USB flash drive as being an auto-launch device type, the response being provided through a USB interface of the USB flash drive to the data source;
providing a backup application from the flash memory of the USB flash drive to the data source, the backup application configured to selectively copy data files stored on the data source to a networked storage thereby creating a set of backed up data files, wherein providing the backup application includes
receiving auto-launch device type commands from the data source, translating the auto-launch device type commands to flash memory device type commands, and sending the flash memory device type commands to the flash memory, and
receiving flash memory device type responses from the flash memory, translating the flash memory device type responses into auto-launch device type responses, and sending the auto-launch device type responses to the data source;
providing a GUI for selection of a backed up data file from amongst the set of backed up data files, and for specification of a task for an online service provider;
receiving a selection of a backed up data file from amongst the set of backed up data files;

receiving a task specification for the online service provider;

automatically connecting to the online service provider; and uploading the selected data file to the automatically connected online service provider.

25. The computer readable medium having stored thereupon computing instructions to perform a method of claim 24 the method further comprising uploading the task specification to the online service provider.

26. The computer readable medium having stored thereupon computing instructions to perform a method of claim 24 wherein receiving the task specification includes receiving a task preference.

27. The computer readable medium having stored thereupon computing instructions to perform a method of claim 24 wherein automatically connecting to the online service provider includes identifying the online service provider.

28. The computer readable medium having stored thereupon computing instructions to perform a method of claim 24 wherein automatically connecting to the online service provider includes providing default user credentials to the online service provider.

29. The computer readable medium having stored thereupon computing instructions to perform a method of claim 24 the method further comprising providing payment information to the online service provider by applying bundled credits.

* * * * *